United States Patent
Nishikiori et al.

(10) Patent No.: US 9,222,419 B2
(45) Date of Patent: Dec. 29, 2015

(54) CONTROL APPARATUS FOR INTERNAL COMBUSTION ENGINE INCLUDING VALVE STOP MECHANISM

(75) Inventors: Takashi Nishikiori, Susono (JP); Norihisa Nakagawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 966 days.

(21) Appl. No.: 13/394,931

(22) PCT Filed: Oct. 27, 2009

(86) PCT No.: PCT/JP2009/068389
§ 371 (c)(1),
(2), (4) Date: Mar. 8, 2012

(87) PCT Pub. No.: WO2011/052035
PCT Pub. Date: May 5, 2011

(65) Prior Publication Data
US 2012/0173122 A1 Jul. 5, 2012

(51) Int. Cl.
*F02D 13/06* (2006.01)
*F02D 13/02* (2006.01)
*F02D 9/06* (2006.01)
(Continued)

(52) U.S. Cl.
CPC *F02D 9/06* (2013.01); *F02D 13/08* (2013.01); *F02D 41/0087* (2013.01); *F02D 41/22* (2013.01); *F02D 41/221* (2013.01);
(Continued)

(58) Field of Classification Search
CPC ........... F02D 9/06; F02D 13/08; F02D 41/22; F02D 41/08; F02D 41/0087; Y02T 10/18; G01M 15/104

USPC ...................... 701/103; 123/90.15; 73/114.79
See application file for complete search history.

(56) References Cited

U.S. PATENT DOCUMENTS

| 5,492,100 A | 2/1996 | Ishii et al. |
| 5,626,108 A * | 5/1997 | Kato et al. ................ 123/90.15 |

(Continued)

FOREIGN PATENT DOCUMENTS

| JP | 6 146937 | 5/1994 |
| JP | 2000 248982 | 9/2000 |

(Continued)

OTHER PUBLICATIONS

International Search Report Issued Nov. 24, 2009 in PCT/JP09/68389 Filed Oct. 27, 2009.

*Primary Examiner* — Hieu T Vo
*Assistant Examiner* — Arnold Castro
(74) *Attorney, Agent, or Firm* — Oblon, McClelland, Maier & Neustadt, L.L.P.

(57) ABSTRACT

A control apparatus which is capable of determining an abnormality of a stopping operation of an exhaust valve without using a dedicated sensor for detecting the abnormality in an internal combustion engine including a valve stop mechanism capable of maintaining the exhaust valve and an intake valve in a valve closed state is provided. It is discriminated whether or not there is a change to a rich side of a air fuel ratio of gas detected by a main A/F sensor at the time of a fuel cut for all the cylinders associated with a valve stop request for the exhaust valves and intake valves of all the cylinders. Then, when it is discriminated that there is the change to the rich side of the air fuel ratio of the gas, it is determined that the stopping operation of the exhaust valve is not performed in a normal manner in at least one cylinder.

16 Claims, 11 Drawing Sheets

(51) Int. Cl.
*F02D 13/08* (2006.01)
*F02D 41/00* (2006.01)
*F02D 41/22* (2006.01)
*F02D 17/02* (2006.01)

(52) U.S. Cl.
CPC ......... *F02D2041/0012* (2013.01); *Y02T 10/18* (2013.01); *Y02T 10/40* (2013.01)

(56) References Cited

U.S. PATENT DOCUMENTS

| | | | |
|---|---|---|---|
| 7,900,509 B2* | 3/2011 | Feldkamp et al. | 73/114.79 |
| 8,826,891 B2* | 9/2014 | Nishikiori et al. | 123/481 |
| 2002/0035986 A1 | 3/2002 | Takagi et al. | |
| 2002/0099495 A1 | 7/2002 | Takagi et al. | |
| 2003/0110845 A1* | 6/2003 | Kumagai et al. | 73/116 |
| 2006/0243040 A1* | 11/2006 | Reed et al. | 73/119 R |
| 2010/0175463 A1* | 7/2010 | Doering et al. | 73/114.37 |
| 2010/0192925 A1* | 8/2010 | Sadakane | 123/520 |
| 2010/0192929 A1* | 8/2010 | Ishiwatari | 123/674 |

FOREIGN PATENT DOCUMENTS

| | | |
|---|---|---|
| JP | 2002 97973 | 4/2002 |
| JP | 2002 221055 | 8/2002 |
| JP | 2004 100486 | 4/2004 |

* cited by examiner

Start
100 During F/C?
102 Is there stopping failure of intake valve?
104 Acquire output of A/F sensor
106 Sensor output < predetermined value?
110 Determine that stopping failure of exhaust valve has occurred
108 Has predetermined time elapsed?
112 Determine that stopping failure of exhaust valve has not occurred
Return

Fig. 11

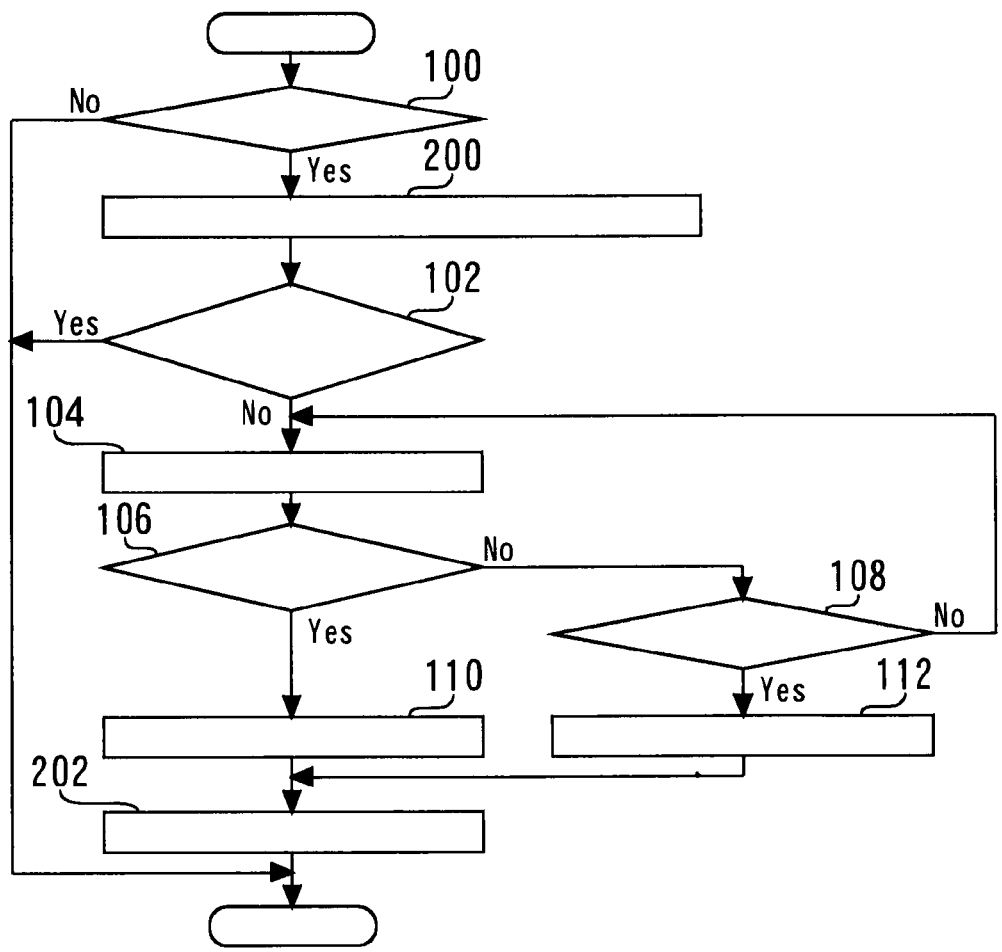

Start
100 During F/C?
200 Prohibit stopping of engine rotation (maintain engine rotation)
102 Is there stopping failure of intake valve?
104 Acquire output of A/F sensor
106 Sensor output < predetermined value?
110 Determine that stopping failure
    of exhaust valve has occurred
202 Permit stopping of engine rotation
108 Has predetermined time elapsed?
112 Determine that stopping failure
    of exhaust valve has not occurred
Return

Fig. 12

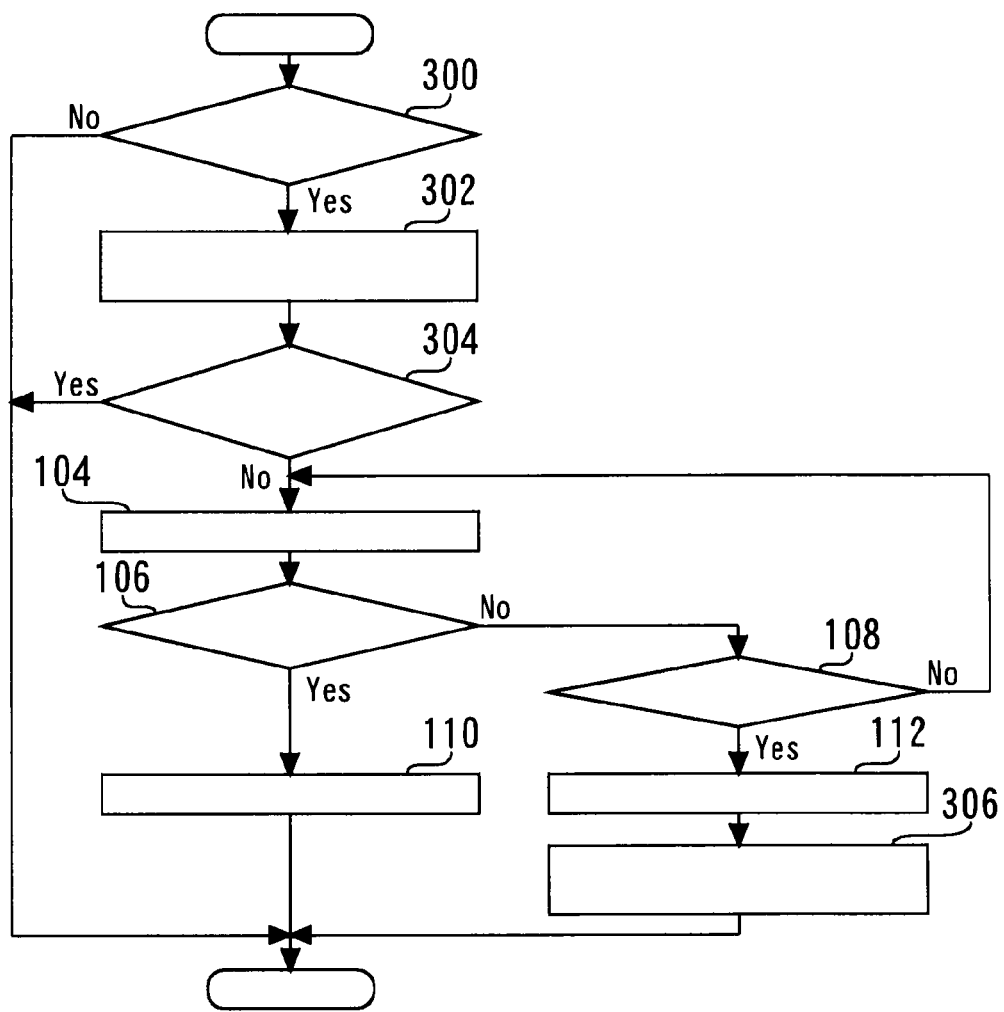

Start
300 During reduced-cylinder operation?
302 Prohibit (halt) A/F feedback control
304 Is there stopping failure of intake valve?
104 Acquire output of A/F sensor
106 Sensor output < predetermined value?
110 Determine that stopping failure of exhaust valve has occurred
108 Has predetermined time elapsed?
112 Determine that stopping failure of exhaust valve has not occurred
306 Permit execution of A/F feedback control
Return

Fig. 13

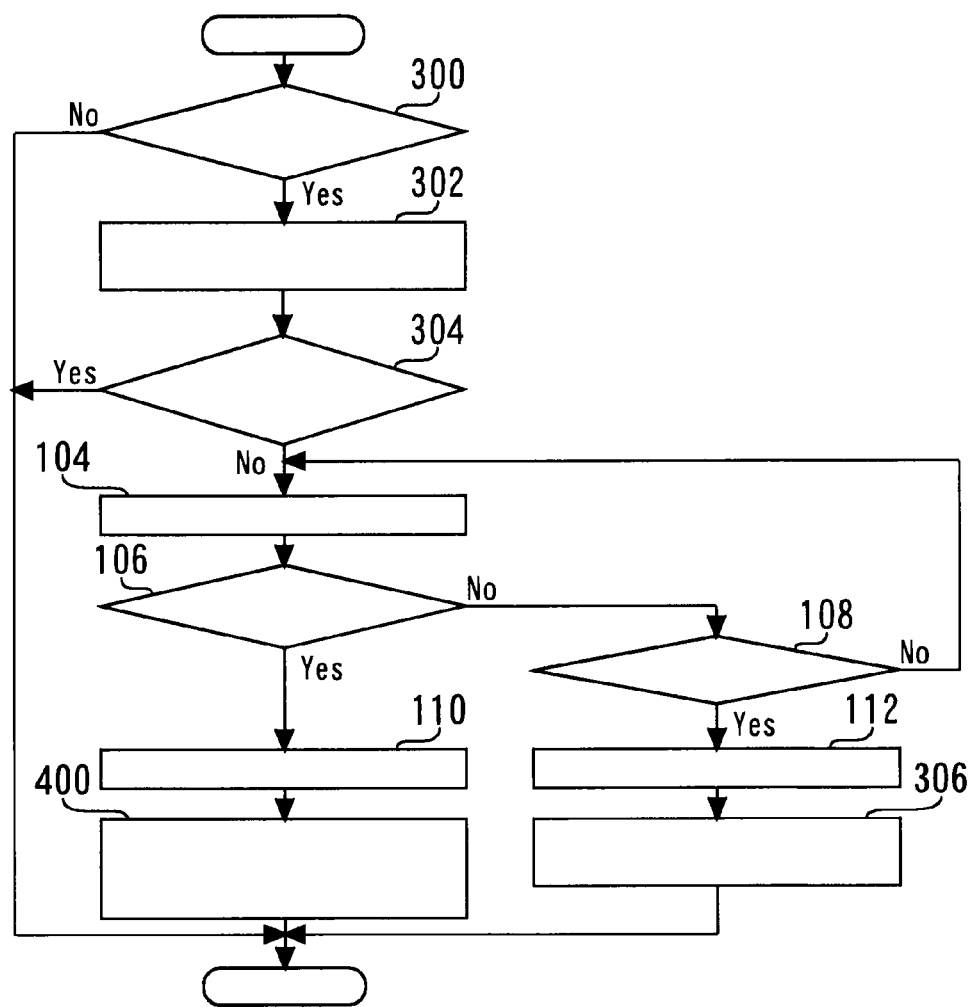

Start
300 During reduced-cylinder operation?
302 Prohibit (halt) A/F feedback control
304 Is there stopping failure of intake valve?
104 Acquire output of A/F sensor
106 Sensor output < predetermined value?
110 Determine that stopping failure
    of exhaust valve has occurred
400 Determine number of cylinders involved with failure
    in accordance with reaching time of sensor output to predetermined value
108 Has predetermined time elapsed?
112 Determine that stopping failure
    of exhaust valve has not occurred
306 Permit execution of A/F feedback control
Return

Fig. 14

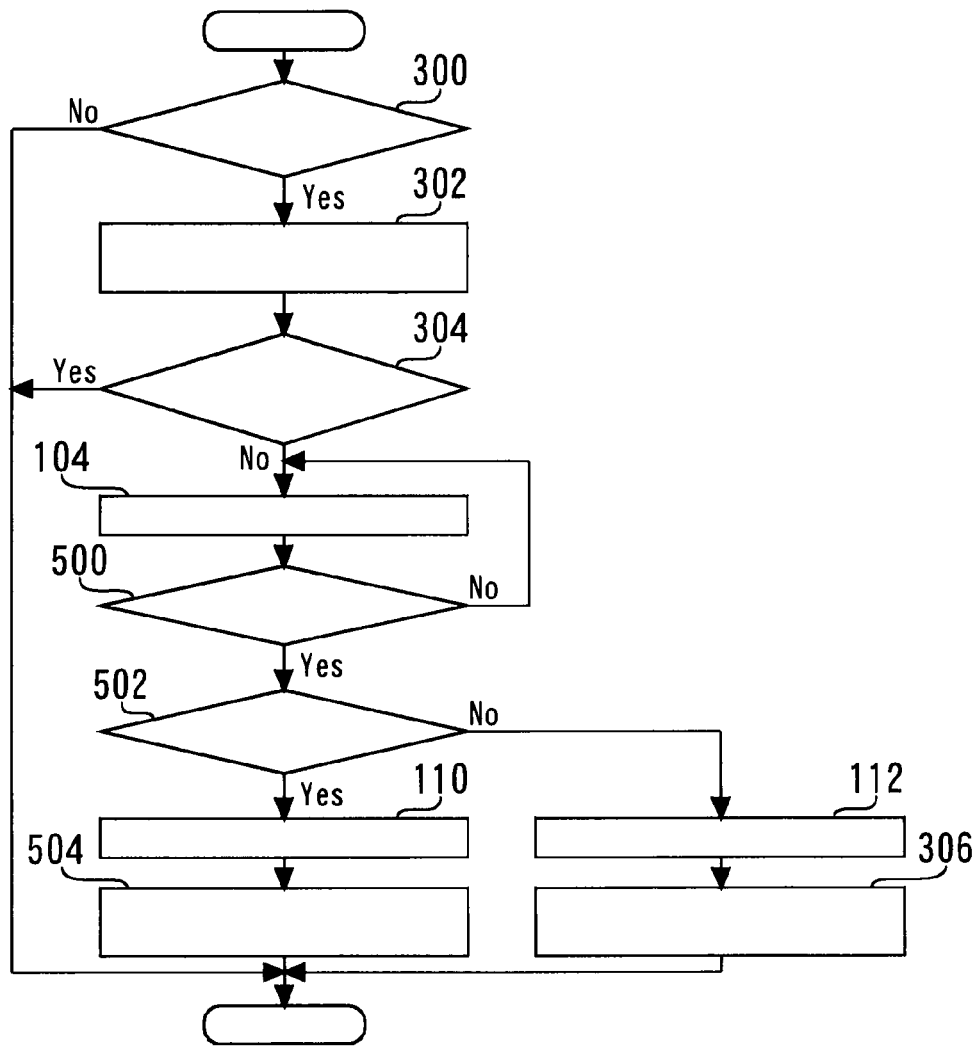

Start
300 During reduced-cylinder operation?
302 Prohibit (halt) A/F feedback control
304 Is there stopping failure of intake valve?
104 Acquire output of A/F sensor
500 Has predetermined time elapsed?
502 Sensor output < predetermined value?
110 Determine that stopping failure of exhaust valve has occurred
504 Determine number of cylinders involved with failure in accordance with level of sensor output
112 Determine that stopping failure of exhaust valve has not occurred
306 Permit execution of A/F feedback control
Return

Fig. 15

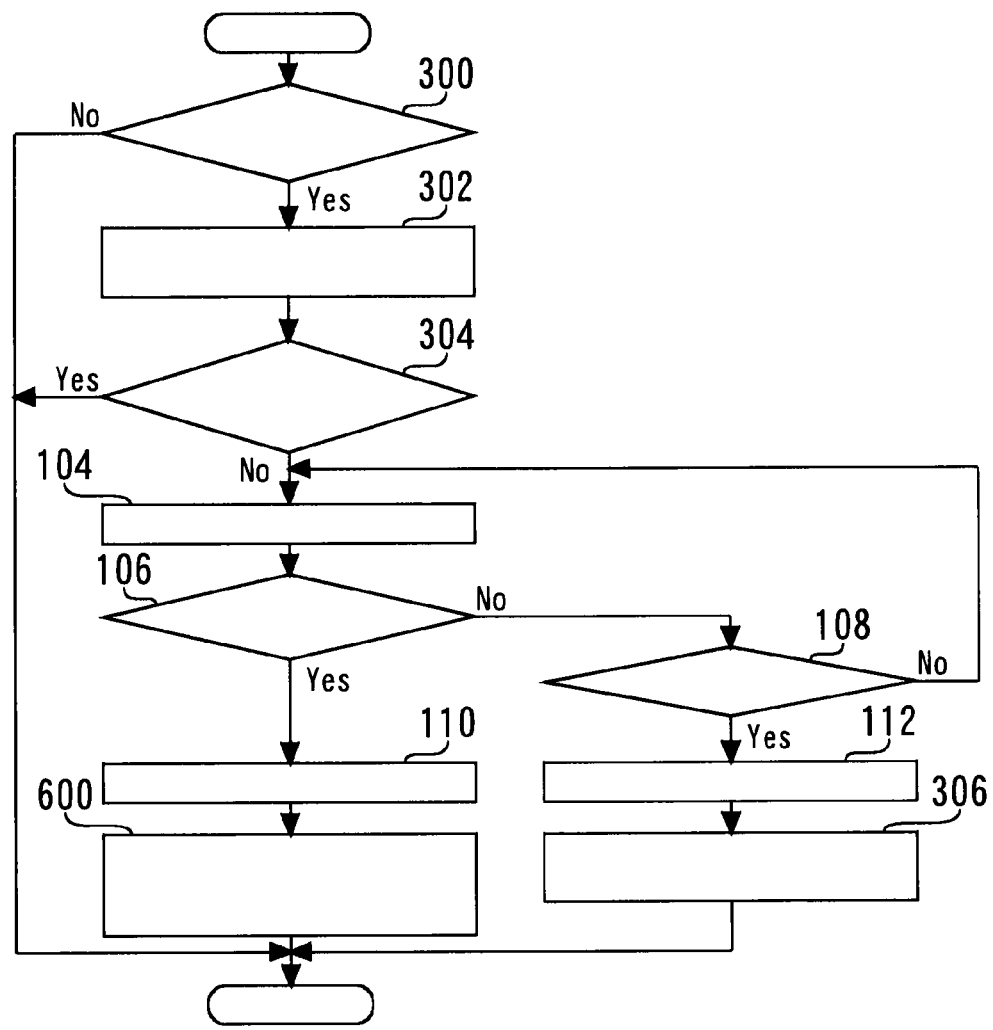

Start
300 During reduced-cylinder operation?
302 Prohibit (halt) A/F feedback control
304 Is there stopping failure of intake valve?
104 Acquire output of A/F sensor
106 Sensor output < predetermined value?
110 Determine that stopping failure
    of exhaust valve has occurred
600 Identify cylinder involved with failure based on timing
    at which gas arrives at A/F sensor
108 Has predetermined time elapsed?
112 Determine that stopping failure
    of exhaust valve has not occurred
306 Permit execution of A/F feedback control
Return

CONTROL APPARATUS FOR INTERNAL COMBUSTION ENGINE INCLUDING VALVE STOP MECHANISM

TECHNICAL FIELD

The present invention relates to a control apparatus for an internal combustion engine including a valve stop mechanism which is capable of maintaining an exhaust valve in a valve closed state.

BACKGROUND ART

Previously, for example, Patent Document 1 discloses a control apparatus for an engine having a cylinder halting mechanism which is capable of maintaining intake and exhaust valves in a valve closed state. This conventional control apparatus is configured to determine whether an abnormality (stopping failure) has not occurred in a stopping operation of the intake and exhaust valves based on an output value of an exhaust gas sensor when the intake and exhaust valves of some of cylinders are closed and stopped associated with a reduced-cylinder operation.

It is noted that the applicant of the present invention recognizes the below described documents including the above described document as the related art of the present invention.

CITATION LIST

Patent Documents

Patent Document 1: Japanese Laid-open Patent Application Publication No. 2004-100486
Patent Document 2: Japanese Laid-open Patent Application Publication No. 2002-221055
Patent Document 3: Japanese Laid-open Patent Application Publication No. 2002-097973
Patent Document 4: Japanese Laid-open Patent Application Publication No. 06-146937

SUMMARY OF INVENTION

Technical Problem

The above described Patent Document 1 describes that when the stopping operation of the intake valve is normal, and the stopping operation of the exhaust valve is abnormal, the effect of such abnormality on the air fuel ratio of exhaust gas is uncertain. Thus, the technique of the above described Patent Document 1 still has a room for improvement in detecting an abnormality of the stopping operation of the exhaust valve based on a change of the air fuel ratio of the exhaust gas.

The present invention has been made to solve the above described problems, and has its object to provide a control apparatus which is capable of determining an abnormality of a stopping operation of an exhaust valve without using a dedicated sensor for detecting the abnormality, in an internal combustion engine including an exhaust valve stop mechanism capable of maintaining the exhaust valve in a valve closed state.

Solution to Problem

A first aspect of the present invention is a control apparatus for an internal combustion engine including a valve stop mechanism, the control apparatus comprising:

an exhaust valve stop mechanism which is capable of changing an operation state of an exhaust valve between a valve operating state and a valve closed and stopped state, the exhaust valve being provided in all cylinders of an internal combustion engine having at least one cylinder;

an air fuel ratio sensor which detects an air fuel ratio of gas discharged from each cylinder;

discrimination means which discriminates a presence or absence of a change to a rich side of an air fuel ratio of the gas detected by the air fuel ratio sensor while fuel supply is stopped for all the cylinders associated with a valve stop request for the exhaust valves of all the cylinders; and exhaust valve abnormality determination means which determines that a stopping operation of the exhaust valve is not performed in a normal manner in at least one cylinder when the discrimination means discriminates that there is the change to the rich side of the air fuel ratio of the gas.

A second aspect of the present invention is the control apparatus for an internal combustion engine including a valve stop mechanism according to the first aspect of the present invention, wherein the internal combustion engine further comprises an intake valve stop mechanism which is capable of changing an operation state of an intake valve between a valve operating state and a valve closed and stopped state, the intake valve being provided in all the cylinders, and wherein the discrimination means discriminates the presence or absence of the change to the rich side of the air fuel ratio of the gas detected by the air fuel ratio sensor while fuel supply is stopped for all the cylinders associated with a valve stop request for the exhaust valves and the intake valves of all the cylinders.

A third aspect of the present invention is the control apparatus for an internal combustion engine including a valve stop mechanism according to the second aspect of the present invention, wherein the control apparatus for an internal combustion engine further comprises intake valve abnormality determination means which determines a presence or absence of an abnormality of a stopping operation of the intake valve by the intake valve stop mechanism, and wherein the exhaust valve abnormality determination means determines that the stopping operation of the exhaust valve is not performed in a normal manner in at least one cylinder when the discrimination means discriminates that there is the change to the rich side of the air fuel ratio of the gas, in a case where it is determined that no abnormality has occurred in the stopping operation of the intake valve.

A fourth aspect of the present invention is the control apparatus for an internal combustion engine including a valve stop mechanism according to any one of the first to third aspects of the present invention, the control apparatus further comprising:

engine rotation maintaining means which maintains rotational driving of a crankshaft of the internal combustion engine until processing to detect abnormality of the stopping operation of the exhaust valve by use of the discrimination means and the exhaust valve abnormality determination means is completed.

A fifth aspect of the present invention is a control apparatus for an internal combustion engine including a valve stop mechanism, the control apparatus comprising:

an exhaust valve stop mechanism which is capable of changing an operation state of an exhaust valve between a valve operating state and a valve closed and stopped state, the exhaust valve being provided in at least one cylinder, but not all cylinders of an internal combustion engine having a plurality of cylinders;

an air fuel ratio sensor which detects an air fuel ratio of gas discharged from each cylinder, the air fuel ratio sensor being disposed in a region where exhaust gas discharged from a plurality of cylinders converges;

discrimination means which discriminates a presence or absence of a change to a rich side of an air fuel ratio of the gas detected by the air fuel ratio sensor, or the presence or absence of a change of a decrease correction amount of a fuel injection amount which cancels the change of the air fuel ratio at the time of a reduced-cylinder operation associated with a valve stop request for the exhaust valve of at least one cylinder, but not all the cylinders; and exhaust valve abnormality determination means which determines that a stopping operation of the exhaust valve is not performed in a normal manner in at least one cylinder when the discrimination means discriminates that there is the change to the rich side of the air fuel ratio of the gas, or the change of the decrease correction amount.

A sixth aspect of the present invention is the control apparatus for an internal combustion engine including a valve stop mechanism according to the fifth aspect of the present invention, wherein the internal combustion engine further comprises an intake valve stop mechanism which is capable of changing an operation state of an intake valve between a valve operating state and a valve closed and stopped state, the intake valve being provided in a cylinder to which the exhaust valve controlled by the exhaust valve stop mechanism belongs, and wherein the discrimination means discriminates the presence or absence of the change to the rich side of the air fuel ratio of the gas detected by the air fuel ratio sensor at the time of the reduced-cylinder operation associated with the valve stop request for the exhaust valve and the intake valve of at least one cylinder, but not all the cylinders.

A seventh aspect of the present invention is the control apparatus for an internal combustion engine including a valve stop mechanism according to the sixth aspect of the present invention, wherein the control apparatus for an internal combustion engine further comprises intake valve abnormality determination means which determines the presence or absence of an abnormality of the stopping operation of the intake valve by the intake valve stop mechanism, and wherein the exhaust valve abnormality determination means determines that the stopping operation of the exhaust valve is not performed in a normal manner in at least one cylinder when the discrimination means discriminates that there is the change to the rich side of the air fuel ratio of the gas, or the change of the decrease correction amount, in a case where it is determined that no abnormality has occurred in the stopping operation of the intake valve.

An eighth aspect of the present invention is a control apparatus for an internal combustion engine including a valve stop mechanism, the control apparatus comprising:

an exhaust valve stop mechanism which is capable of changing an operation state of an exhaust valve between a valve operating state and a valve closed and stopped state, the exhaust valve being provided in at least one cylinder, but not all cylinders of an internal combustion engine having a plurality of cylinders;

an intake valve stop mechanism which is capable of changing an operation state of an intake valve between a valve operating state and a valve closed and stopped state, the intake valve being provided in a cylinder to which the exhaust valve controlled by the exhaust valve stop mechanism belongs, intake valve abnormality determination means which determines a presence or absence of an abnormality of a stopping operation of the intake valve by the intake valve stop mechanism;

an air fuel ratio sensor which detects an air fuel ratio of gas discharged from each cylinder;

discrimination means which discriminates a presence or absence of a change to a rich side of an air fuel ratio of the gas detected by the air fuel ratio sensor, or the presence or absence of a change of a decrease correction amount of a fuel injection amount which cancels the change of the air fuel ratio at the time of a reduced-cylinder operation associated with a valve stop request for the exhaust valve and the intake valve of at least one cylinder, but not all the cylinders; and exhaust valve abnormality determination means which determines that a stopping operation of the exhaust valve is not performed in a normal manner in at least one cylinder when the discrimination means discriminates that there is the change to the rich side of the air fuel ratio of the gas, or the change of the decrease correction amount, in a case where it is determined that no abnormality has occurred in stopping operation of the intake valve.

A ninth aspect of the present invention is the control apparatus for an internal combustion engine including a valve stop mechanism according to any one of the fifth to eighth aspects of the present invention, the control apparatus further comprising:

feedback control prohibition means which prohibits execution of a feedback control of an air fuel ratio utilizing an output of the air fuel ratio sensor until processing to detect abnormality of the stopping operation of the exhaust valve by using the discrimination means and the exhaust valve abnormality determination means is completed.

A tenth aspect of the present invention is the control apparatus for an internal combustion engine including a valve stop mechanism according to any one of the first to fourth aspects of the present invention, wherein the air fuel ratio sensor is disposed in a region where exhaust gas discharged from a plurality of cylinders converges, wherein the discrimination means includes change rate acquisition means which acquires the change rate to the rich side of the air fuel ratio of the gas while fuel supply is stopped for all the cylinders associated with the valve stop request for the exhaust valves of all the cylinders, and wherein the exhaust valve abnormality determination means includes number-of-exhaust-valve-abnormality-cylinder determination means which determines that the stopping operation of the exhaust valve is not performed in a normal manner in more cylinders as the change rate to the rich side of the air fuel ratio of the gas increases.

An eleventh aspect of the present invention is the control apparatus for an internal combustion engine including a valve stop mechanism according to any one of the fifth to ninth aspects of the present invention, wherein the air fuel ratio sensor is disposed in a region where exhaust gas discharged from a plurality of cylinders converges, wherein the discrimination means includes change rate acquisition means which acquires a change rate to a rich side of the air fuel ratio of the gas, or a change rate to an increasing side of a decrease correction amount of a fuel injection amount which cancels the change of the air fuel ratio at the time of the reduced-cylinder operation associated with the valve stop request for the exhaust valve of at least one cylinder, but not all the cylinders, and wherein the exhaust valve abnormality determination means includes number-of-exhaust-valve-abnormality-cylinder determination means which determines that the stopping operation of the exhaust valve is not performed in a normal manner in more cylinders as the change rate to the rich side of the air fuel ratio of the gas, or the change rate to an increasing side of the decrease correction amount increases.

A twelfth aspect of the present invention is the control apparatus for an internal combustion engine including a valve stop mechanism according to any one of the first to eleventh aspects of the present invention, wherein the air fuel ratio sensor is disposed in a region where exhaust gas discharged from a plurality of cylinders converges, wherein the discrimination means includes rich cylinder discrimination means which discriminates a cylinder in which the air fuel ratio of the gas changes to a value of the rich side based on a timing at which the gas discharged from each cylinder arrives at the air fuel ratio sensor, and wherein the exhaust valve abnormality determination means further comprises exhaust valve abnormality cylinder identification means which identifies that a cylinder which is discriminated by the rich cylinder discrimination means that the air fuel ratio of the gas changed to the value of the rich side is a cylinder in which an abnormality of the stopping operation of the exhaust valve has occurred.

A thirteenth aspect of the present invention is the control apparatus for an internal combustion engine including a valve stop mechanism according to the three aspect of the present invention, the control apparatus further comprising:

lean change discrimination means which discriminates a presence or absence of a change to a lean side of the air fuel ratio of the gas detected by the air fuel ratio sensor, while fuel supply is stopped for all the cylinders associated with the valve stop request for the exhaust valves and the intake valves of all the cylinders; and intake and exhaust valve abnormality determination means which determines that stopping operations of the intake valve and the exhaust valve are not performed in a normal manner in the at least one cylinder when the lean change discrimination means discriminates that there is the change to the lean side of the air fuel ratio of the gas.

A fourteenth aspect of the present invention is the control apparatus for an internal combustion engine including a valve stop mechanism according to the seventh or eighth aspect of the present invention, the control apparatus further comprising:

lean change discrimination means which discriminates a presence or absence of a change to a lean side of the air fuel ratio of the gas detected by the air fuel ratio sensor, or a presence or absence of a change to an increasing side of a increase correction amount of a fuel injection amount which cancels the change of the air fuel ratio, at the time of a reduced-cylinder operation associated with a valve stop request for the exhaust valve and the intake valve of at least one cylinder, but not all the cylinders; and intake and exhaust valve abnormality determination means which determines that stopping operations of the intake valve and the exhaust valve are not performed in a normal manner in at least one cylinder, when the lean change discrimination means discriminates that there is the change to the lean side of the air fuel ratio of the gas or the change of the increase correction amount.

A fifteenth aspect of the present invention is the control apparatus for an internal combustion engine including a valve stop mechanism according to the third, seventh or eighth aspect of the present invention, wherein the internal combustion engine further comprises a valve sensor which detects a presence or absence of an open/close motion of the intake valve, and wherein the intake valve abnormality determination means determines the presence or absence of an abnormality of the stopping operation of the intake valve based on an output of the valve sensor.

A sixteenth aspect of the present invention is the control apparatus for an internal combustion engine including a valve stop mechanism according to the third aspect of the present invention, wherein the internal combustion engine further comprises an intake pressure sensor which detects intake pressure, and wherein the intake valve abnormality determination means determines the presence or absence of an abnormality of the stopping operation of the intake valve when intake pressure equals atmospheric pressure while fuel supply is stopped for all the cylinders associated with the valve stop request for the exhaust valves and the intake valves of all the cylinders.

A seventeenth aspect of the present invention is the control apparatus for an internal combustion engine including a valve stop mechanism according to the third aspect of the present invention, wherein the internal combustion engine further comprises an air flow meter which detects an intake air flow rate, and wherein the intake valve abnormality determination means determines the presence or absence of an abnormality of the stopping operation of the intake valve when the intake air flow rate is not detected by the air flow meter while fuel supply is stopped for all the cylinders associated with the valve stop request for the exhaust valves and the intake valves of all the cylinders.

Advantageous Effects of Invention

When the stopping operation of the exhaust valve is not performed in a normal manner while fuel supply is stopped for all the cylinders associated with a valve stop request for the exhaust valves of all the cylinders, the air fuel ratio of the gas detected by the air fuel sensor changes to a value of the rich side as a result of the fuel adherent on the wall surface inside the cylinder evaporating and being discharged into the exhaust passage. According to the first or second aspect of the present invention, it becomes possible to determine an abnormality of the stopping operation of the exhaust valve based on the presence or absence of such a rich change of the air fuel ratio without using a dedicated sensor for detecting the abnormality.

When it is determined that the stopping operation of the intake valve is normal, the rate of air flow passing from inside the cylinder to the air fuel ratio sensor does not change since fresh air does not flow into the cylinder via the intake valve. Therefore, according to the third aspect of the present invention, it is possible to perform the abnormality determination with a high accuracy by determining the presence or absence of an abnormality of the stopping operation of the exhaust valve according to the air fuel ratio when it is determined that the stopping operation of the intake valve is normal.

According to the fourth aspect of the present invention, it becomes possible to reliably secure a chance to diagnose an abnormality of the stopping operation of exhaust valve while fuel supply is stopped for all the cylinders associated with a valve stop request for the intake and exhaust valves of all the cylinders.

When the stopping operation of the exhaust valve is not performed in a normal manner at the time of a reduced-cylinder operation associated with a valve stop request for the exhaust valve of at least one cylinder, but not all the cylinders, the air fuel ratio of the gas detected by the air fuel sensor changes to the value of the rich side as a result of the fuel adherent on the wall surface inside the cylinder evaporating and being discharged into the exhaust passage. According to the fifth or sixth aspect of the present invention, it becomes possible to determine an abnormality of the stopping operation of the exhaust valve without using a dedicated sensor for detecting the abnormality, based on the presence or absence of such a rich change of the air fuel ratio, or the presence or absence a change to the increasing side of the decrease correction amount of the fuel injection amount associated with the rich change.

According to the seventh or eighth aspect of the present invention, it becomes possible to accurately determine the presence or absence of an abnormality of the stopping operation of the exhaust valve without being influenced by the change of the air fuel ratio in other operating cylinders associated with an occurrence of abnormality of the stopping operation of an intake valve.

According to the ninth aspect of the present invention, it becomes possible to reliably secure a chance to diagnose the stopping failure of the exhaust valve by utilizing the output of the air fuel ratio sensor without being influenced by the feedback control of the air fuel ratio, at the time of a reduced-cylinder operation associated with a valve stop request for at least the exhaust valve of some of the cylinders.

According to the tenth or eleventh aspect of the present invention, it becomes possible to determine the number of cylinders in which an abnormality of the stopping operation of the exhaust valve has occurred based on the information relating to the air fuel ratio of the gas which is discharged from each cylinder, or information relating to the decrease correction amount of the fuel injection amount associated with the change of the air fuel ratio.

According to the twelfth aspect of the present invention, it is possible to identify a cylinder in which an abnormality of the stopping operation of the exhaust valve has occurred by utilizing a timing at which the gas discharged from the cylinder, in which the abnormality has occurred, arrives at the air fuel ratio sensor.

When an abnormality of the stopping operation occurs at the exhaust valve and the intake valve in the same cylinder while fuel supply is stopped for all the cylinders, or at the time of the above described reduced-cylinder operation, the gas discharged from the cylinder in which an abnormality has occurred becomes a lean gas close to fresh air. Therefore, it is possible to distinguish such an abnormality of the stopping operation at both the valves from an abnormality of the stopping operation at the exhaust valve alone according to the detection result of the air fuel ratio. According to the thirteenth or fourteenth aspect of the present invention, it becomes possible to determine an abnormality of the stopping operation of the intake and exhaust valves based on the presence or absence of such a lean change of air fuel ratio, or the presence or absence of a change to the increasing side of the increase correction amount of the fuel injection amount associated with the lean change.

According to any of the fifteenth to seventeenth aspects of the present invention, it is possible to well determine an abnormality of the stopping operation of the intake valve by using each sensor included in each aspect of the present invention.

BRIEF DESCRIPTION OF DRAWINGS

FIG. 11 is a flowchart of a routine that is executed in the second embodiment of the present invention;

FIG. 12 is a flowchart of a routine that is executed in the third embodiment of the present invention;

FIG. 13 is a flowchart of a routine that is executed in the fourth embodiment of the present invention;

FIG. 14 is a flowchart of a routine that is executed in the fifth embodiment of the present invention; and FIG. 15 is a flowchart of a routine that is executed in the sixth embodiment of the present invention.

Figure 1:
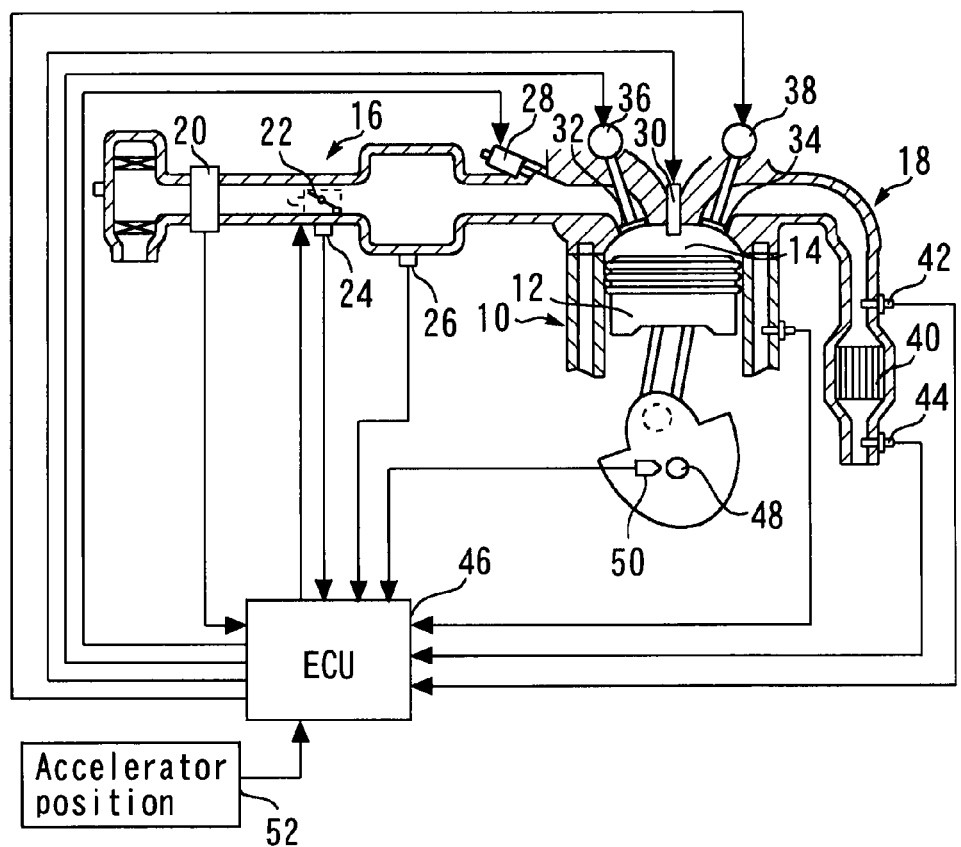
FIG. 1 is a diagram to illustrate a system according to a first embodiment of the present invention.

DESCRIPTION OF SYMBOLS 10 internal combustion engine
10 internal combustion engine
12 piston
14 combustion chamber
16 intake passage
18 exhaust passage
18a exhaust manifold
20 air flow meter
26 intake pressure sensor
28 fuel injection valve
32 intake valve
34 exhaust valve
36 intake variable valve operating apparatus
38 exhaust variable valve operating apparatus
40 catalyst
42 main A/F sensor
44 sub $O_2$ sensor
46 ECU (Electronic Control Unit)
48 crankshaft
50 crank angle sensor
76 valve stop mechanism
100 driving system
102 motor
104 generator
106 power split mechanism

DESCRIPTION OF EMBODIMENTS

First Embodiment
[System Configuration of Internal Combustion Engine]

Figure 2:
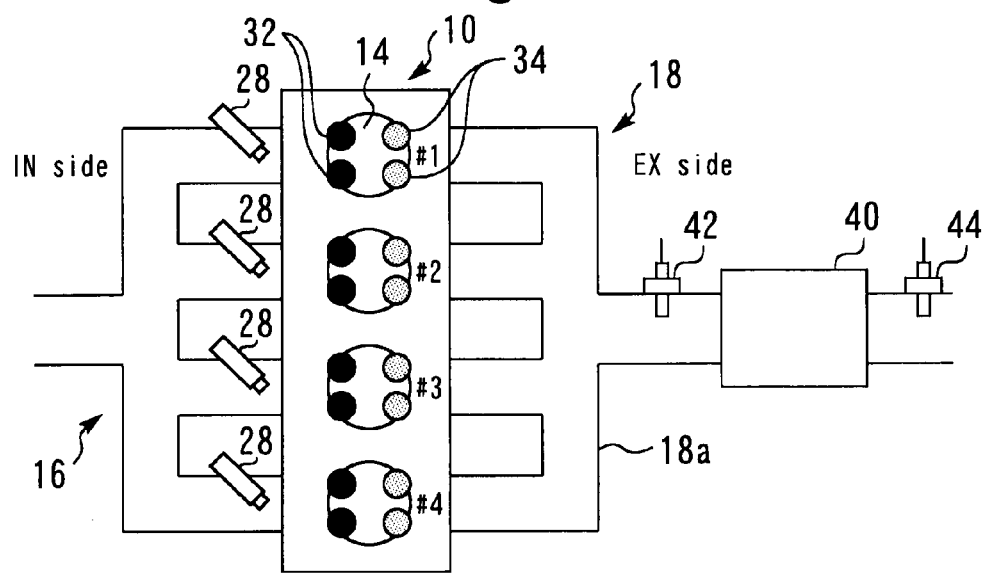
FIG. 2 is a diagram to illustrate the system according to the first embodiment of the present invention.

FIGS. 1 and 2 are diagrams to each illustrate a system according to a first embodiment of the present invention. The system shown in FIG. 1 includes an internal combustion engine 10. Though the number of cylinders and the cylinder arrangement of the internal combustion engine in the present invention are not specifically limited, it is assumed that the internal combustion engine 10 in the present embodiment is an inline 4-cylinder engine having four cylinders No. 1 to No. 4.

There is provided a piston 12 in each cylinder of the internal combustion engine 10. A combustion chamber 14 is formed at the top side of the piston 12 in each cylinder. An intake passage 16 and exhaust passage 18 are in communication with the combustion chamber 14. An airflow meter 20, which outputs a signal in accordance with the flow rate of air sucked into the intake passage 16 is provided in the vicinity of an inlet of the intake passage 16.

A throttle valve 22 is provided downstream of the air flow meter 20. A throttle position sensor 24 for detecting a throttle opening is provided in the vicinity of the throttle valve 22. An intake pressure sensor 26 for detecting intake pressure (intake pipe pressure) is disposed in the downstream of the throttle valve 22. Moreover, a fuel injection valve 28 for injecting fuel into an intake port, and an ignition plug 30 for igniting air fuel mixture in the combustion chamber 14 are provided in each cylinder of the internal combustion engine 10.

As shown in FIG. 2, two intake valves 32 and two exhaust valves 34 are provided in each cylinder of the internal combustion engine 10. The intake valve 32 is driven by an intake variable valve operating apparatus 36, and the exhaust valve 34 is driven by an exhaust variable valve operating apparatus 38. As described below, the intake variable valve operating apparatus 36 and the exhaust variable valve operating apparatus 38 include a valve stop mechanism 76 which is capable of maintaining the intake valve 32 and the exhaust valve 34 in a valve closed state, respectively.

A catalyst 40 for purifying exhaust gas is disposed in the midway in the exhaust passage 18. Further, as shown in FIG. 2, a main A/F sensor 42 for detecting the air fuel ratio of the gas discharged from inside each cylinder is attached in the exhaust passage 18 (a region after exhaust gas from each cylinder comes together in an exhaust manifold 18a) at the upstream side of the catalyst 40. As the main A/F sensor 42, for example, a sensor that generates an output that is approximately linear to the air fuel ratio of exhaust gas can be used. Furthermore, a sub $O_2$ sensor 44 is disposed in the downstream of the catalyst 40. As the sub $O_2$ sensor 44, for example, a sensor that generates a signal according to whether the air fuel ratio of exhaust gas at that position is rich or lean can be used.

The system of the present embodiment includes an ECU (Electronic Control Unit) 46. The ECU 46 is electrically connected with various sensors for controlling the internal combustion engine 10, such as a crank angle sensor 50 for detecting the rotation angle of a crankshaft 48 and engine rotational speed, and an accelerator position sensor 52 for detecting the position of an accelerator pedal of a vehicle equipped with the internal combustion engine 10, as well as the above described main A/F sensor 42 and the like. Further, the ECU 46 is electrically connected with various actuators such as the fuel injection valve 28. The ECU 46 controls the operational state of the internal combustion engine 10 based on those sensor outputs.

[Configuration of Variable Valve Operating Apparatus]

Next, referring to FIGS. 3 to 6, the configuration of the variable valve operating apparatuses of the present embodiment and operation thereof will be described. It is noted that since the exhaust variable valve operating apparatus 38 and the intake variable valve operating apparatus 36 have the same configuration, description will be made taking the exhaust variable valve operating apparatus 38 as an example.

Figure 3:
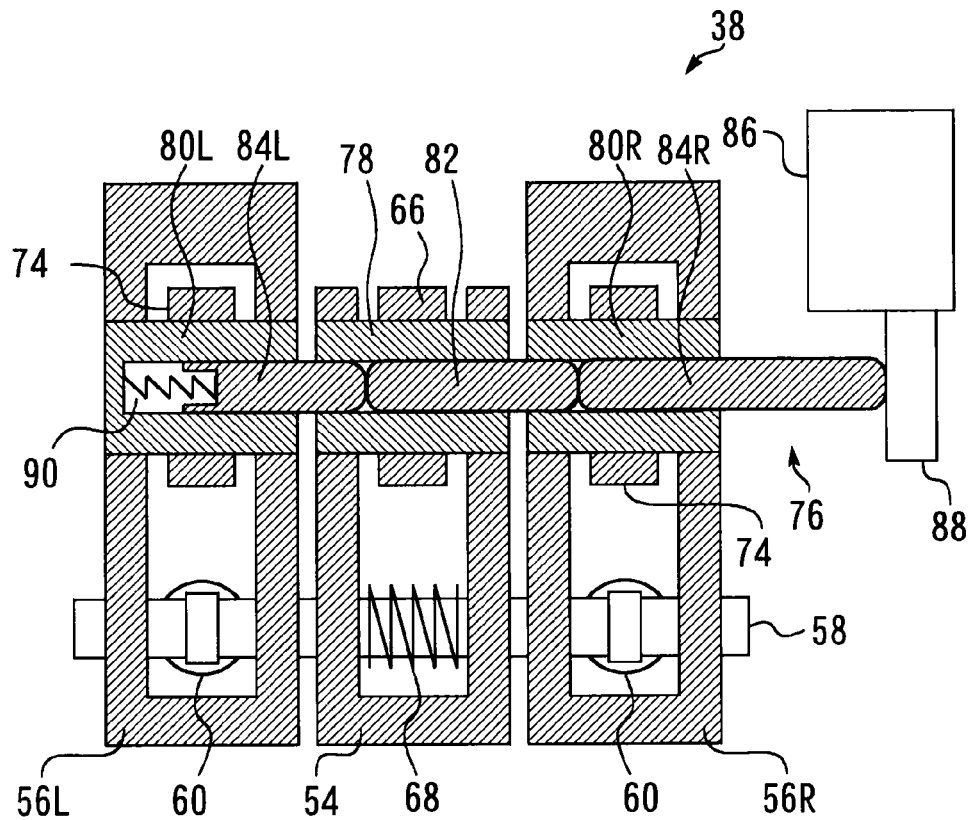
FIG. 3 is a cross-sectional view of a first rocker arm and second rocker arms, included in an exhaust variable valve operating apparatus.
Figure 5:
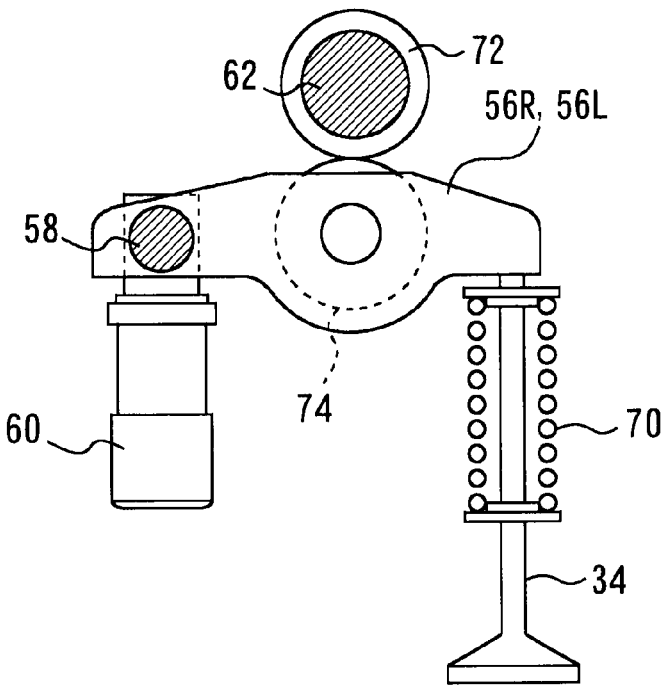
FIG. 5 is a side view of the second rocker arms.
Figure 6:
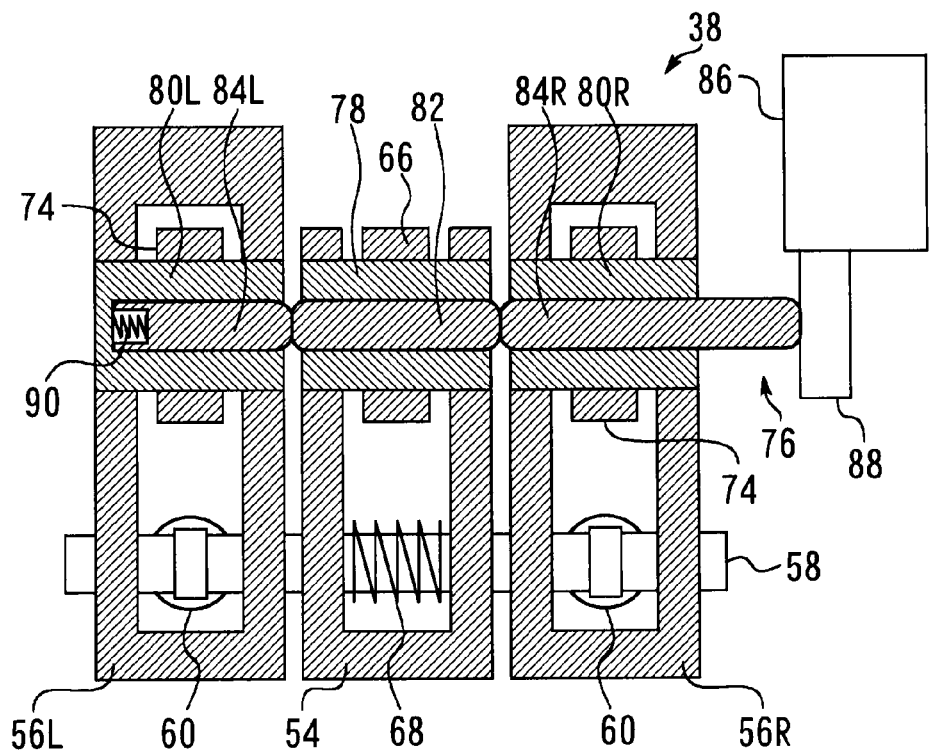
FIG. 6 is a cross-sectional view of the first rocker arm and the second rocker arms, included in the exhaust variable valve operating apparatus.

FIGS. 3 and 6 are cross-sectional views of a first rocker arm 54 and second rocker arms 56R and 56L, included in the exhaust variable valve operating apparatus 38, respectively. Moreover, FIG. 4 is a side view of the first rocker arm 54, and FIG. 5 is a side view of the second rocker arms 56R and 56L.

As shown in FIG. 3, the exhaust variable valve operating apparatus 38 includes the first rocker arm 54 and a pair of second rocker arms 56R and 56L disposed on both sides thereof, in each cylinder. These rocker arms 54, 56R and 56L are configured to be swingable centering around a common rocker shaft 58. The rocker shaft 58 is supported by a cylinder head of the internal combustion engine 10 via a pair of hydraulic lash adjusters 60.

Figure 4:
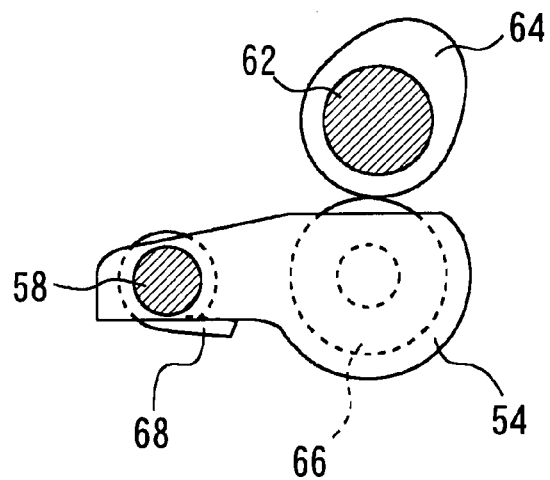
FIG. 4 is a side view of the first rocker arm.

As shown in FIG. 4, the exhaust variable valve operating apparatus 38 has a camshaft 62. The camshaft 62 is linked with the crankshaft 48 via a timing chain or the like and rotates at a speed which is a half of that of the crankshaft 48. The camshaft 62 includes a lift cam 64 for opening and closing the exhaust valve 34 by driving it. Meanwhile, the first rocker arm 54 is provided with a first roller 66. The first rocker arm 54 is biased in the counterclockwise direction by a torsion coil spring 68 in FIG. 4. The first roller 66 is pressed against the lift cam 64 by the biasing force. This configuration causes the first rocker arm 54 to swing as the lift cam 64 rotates.

As shown in FIG. 5, movable ends of the second rocker arms 56R and 56L are each in abutment with the ends of valve stems of the two exhaust valves 34. The exhaust valve 34 is biased in the valve-closing direction by a valve spring 70. The camshaft 62 includes a pair of zero lift cams 72 on both sides of the lift cam 64. The zero lift cam 72 takes on a perfect circle having the same radius as that of the base circle of the lift cam 64. The second rocker arms 56R and 56L are each provided with a second roller 74. The outer diameter of the roller 74 is equal to that of the first roller 66 provided in the first rocker arm 54. Moreover, the distance between the centers of the rocker shaft 58 and the second roller 74 is equal to the distance between the centers of the rocker shaft 58 and the first roller 66. While the exhaust valve 34 is closed, the second roller 74 is in abutment with the zero lift cam 72.

The exhaust variable valve operating apparatus 38 includes the valve stop mechanism 76 that switches between a linked state and a separated state of the first rocker arm 54 and the second rocker arms 56R and 56L. The valve stop mechanism 76 is configured to be able to switch the operation states of the exhaust valve 34 between a valve operating state and a valve closed and stopped state by switching between the state in which the acting force of the lift cam 64 is transferred to the second rocker arms 56R and 56L via the first rocker arm 54, and the state in which the acting force is not transferred to the second rocker arms 56R and 56L using such a switching operation.

As shown in FIG. 3, the first rocker arm 54 has a first sleeve 78 that is placed concentrically with the first roller 66, and the second rocker arms 56R and 56L have second sleeves 80R and 80L, respectively, that are placed concentrically with the second rollers 74.

In the state shown in FIG. 3, a part of a first pin 82 whose major part is inserted into the first rocker arm 54 is inserted into the second sleeve 80R of the second rocker arm 56R, and a part of a second pin 84L whose major part is inserted into the second rocker arm 56L is inserted into the first sleeve 78 of the first rocker arm 54. This results in that the first rocker arm 54 and the second rocker arm 56R are linked via the first pin 82, and the first rocker arm 54 and the second rocker arm 56L are linked via the second pin 84L. Thus, when the first rocker arm 54 swings as the lift cam 64 rotates, concurrently with this, the second rocker arms 56R and 56L swing, thereby causing the exhaust valve 34 to perform an open/close motion.

One end of a second pin 84R projects beyond the side face of the second rocker arm 56R. This projected one end of the second pin 84R is in abutment with a displacement member 88 of driving means 86. The driving means 86 is configured to be able to displace the displacement member 88 in a left and right hand direction in FIG. 3 according to a command of the ECU 46.

One end of the second sleeve 80L of the second rocker arm 56L is closed, and a return spring 90 is placed therein. This return spring 90 presses the second pin 84L toward the right hand direction in FIG. 3. This causes the first pin 82 and the second pins 84R and 84L to be biased toward the right hand direction in FIG. 3.

In a linked sate shown in FIG. 3, if the driving means 86 displaces the displacement member 88 toward the left hand direction in FIG. 3 with a force overcoming the biasing force of the return spring 90, the first pin 82 and the second pins 84R and 84L move toward the left hand direction in FIG. 3 thereby turning into a state shown in FIG. 6. In this state, the first pin 82 and the second pin 84L are in abutment with each other in a gap between the first rocker arm 54 and the second rocker arm 56L, and the first pin 82 and the second pin 84R are in abutment with each other in a gap between the first rocker arm 54 and the second rocker arm 56R. As a result of this, even if the first rocker arm 54 swings as the lift cam 64 rotates, the swinging is not transferred to the second rocker arms 56R and 56L. Then, the second rollers 74 of the second rocker arm 56R, 56L are in contact with the zero lift cams 72 that have no cam nose. As a result of this, even when the camshaft 62 rotates, the second rocker arms 56R and 56L do not swing, and the exhaust valve 34 turns into the valve closed and stopped state.

Moreover, in the state shown in FIG. 6, that is, in a state where the first rocker arm 54 and the second rocker arms 56R and 56L are separated, when the first roller 66 of the first rocker arm 54 is in contact with the base circle of the lift cam 64 as shown in FIG. 4, the centers of the three pins 82, 84R and 84L coincide. At this moment, by operating the driving means 86 to move these pins 82, 84R and 84L toward the right hand direction in FIG. 6, it is possible to switch into the linked state shown in FIG. 3.

As so far described, the exhaust valve variable operating apparatus 38 is capable of switching the operation states of the exhaust valve 34 between the valve operating state and the valve closed and stopped state, by switching between the linked state and the separated state of the first rocker arm 54 and the second rocker arm 56R, 56L. Moreover, such switching of the operation state of the exhaust valve 34 can be freely performed for each cylinder. Further, by the intake variable valve operating apparatus 36 that is configured in a similar manner with the exhaust variable valve operating apparatus 38, it is possible to switch the operation states of the intake valve 32 between the valve operating state and the valve closed and stopped state for each cylinder.

[Method for Determining Abnormality of Stopping Operation of Exhaust Valve]

According to the system of the present embodiment including the above described variable valve operating apparatuses 36 and 38, it is possible to prevent fresh air from flowing into the catalyst 40 thereby suppressing the degradation of the catalyst 40, by turning the intake valves 32 and the exhaust valves 34 of all the cylinders into the valve closed and stopped state at the time of a fuel cut targeted for all the cylinders, such as during deceleration. According to the variable valve operating apparatuses 36 and 38 having the configuration described above, at the time of a valve stop request for turning the intake valve 32 or the exhaust valve 34 into the valve closed and stopped state, when a stopping operation of the intake valve 32 or the exhaust valve 34 is not performed in a normal manner (hereafter, also referred to simply as "stopping failure" in some cases) due to, for example, a failure of the driving means 86, the intake valve 32 or the exhaust valve 34 is turned into the valve operating state in which the open/close motion is performed as usual.

Figure 7:
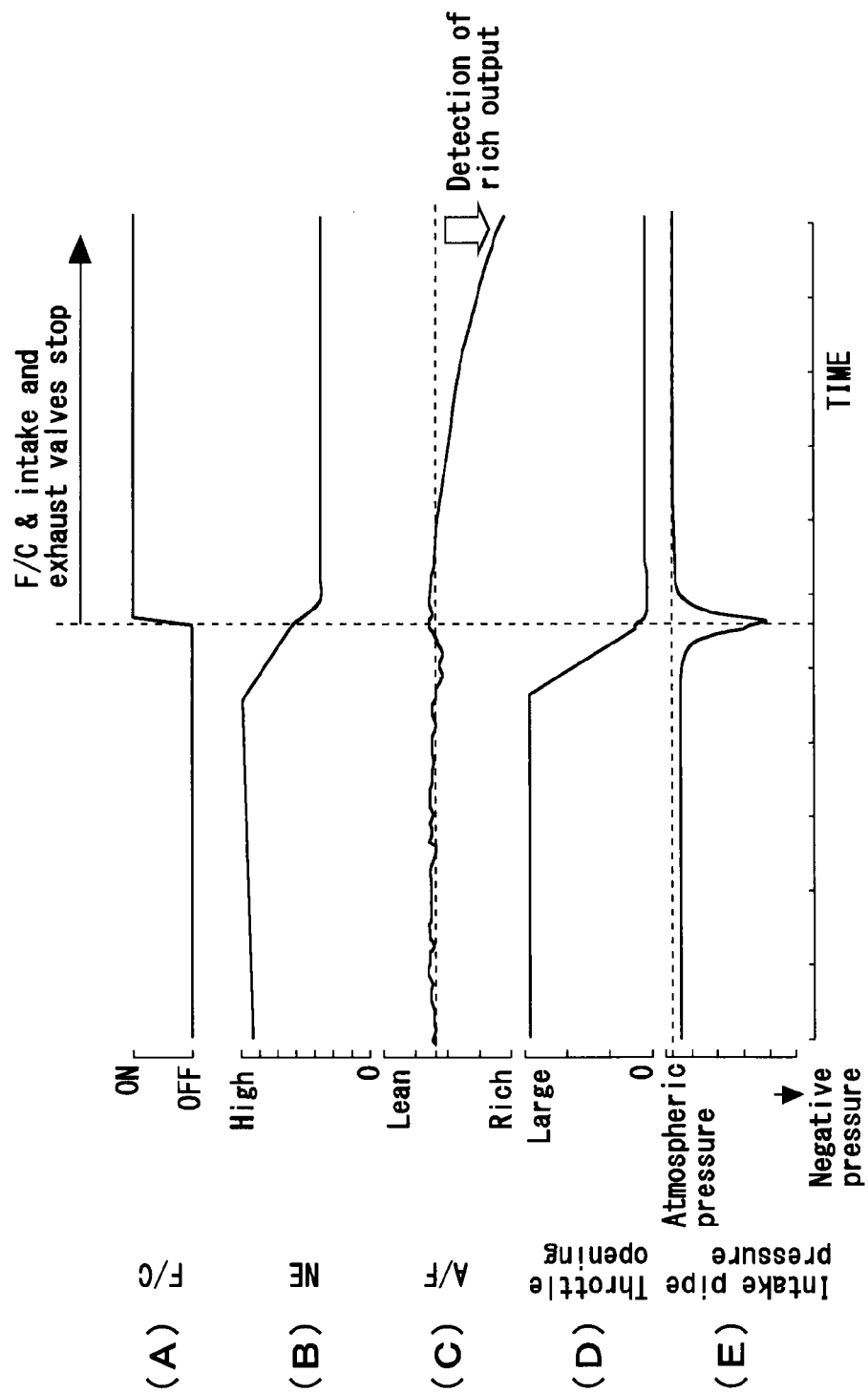
FIG. 7 is a time chart to illustrate the change in an air fuel ratio of exhaust gas when a stopping failure of an exhaust valve has occurred in some of cylinders at the time of a fuel cut for all the cylinders associated with a valve stop request for intake and exhaust valves of all the cylinders.

FIG. 7 is a time chart to illustrate the change in the air fuel ratio of exhaust gas when a stopping failure of the exhaust valve 34 has occurred in some of the cylinders at the time of a fuel cut for all the cylinders associated with a valve stop request for the intake and exhaust valves 32 and 34 of all the cylinders. To be more specific, FIGS. 7(A) to 7(E) are diagrams to show each waveform of the presence or absence of the execution of the fuel cut (F/C), engine rotational speed (NE), output of the main A/F sensor 42, throttle opening, and intake pipe pressure.

A fuel cut is started, as shown in FIGS. 7(A) and (D), when the throttle opening is brought to an idling opening which is close to a fully closed state during the operation of the internal combustion engine 10. Here, it is assumed that a valve stop request for the intake and exhaust valves 32 and 34 is issued in coincidence with the start of the fuel cut. When the stopping operation of the intake valve 32 of each cylinder has been performed in a normal manner in response to the valve stop request, the intake pipe pressure is once turned into a significantly negative pressure in accordance with the decrease in the throttle opening immediately before the execution of the fuel cut, and then becomes an atmospheric pressure as shown in FIG. 7(E) since it becomes not to be influenced by the reciprocating movement of the piston 12 of each cylinder.

When the stopping failure of the exhaust valve 34 has occurred in at least one cylinder in the state shown in FIG. 7 (a state in which the engine rotational speed is not zero during the fuel cut), in other words, when the exhaust valve 34 is performing the open/close motion at a predetermined open/close timing in at least one cylinder in a state where the stopping operation of the intake valve 32 is being performed in a normal manner for all the cylinders, the following operation is performed in a cylinder in which the stopping failure has occurred. That is, in the cylinder involved with the stopping failure, the exhaust valve 34 is to be opened in the midway of an expansion stroke during which the pressure in the cylinder is negative. As a result of that, the gas in the exhaust passage 18 (the exhaust manifold 18a) is vigorously sucked into the cylinder through the exhaust valve 34. The sucked gas is discharged into the exhaust passage 18 again in the exhaust stroke immediately after that. Thereafter, while the rotation of the internal combustion engine 10 continues as shown in FIG. 7(B) during the fuel cut, a back and forth movement of the gas between the combustion chamber 14 of the cylinder involved with stopping failure and the exhaust passage 18 is repeated.

Part of supplied fuel adheres to the wall surface of each cylinder of the internal combustion engine 10 in an unburnt state. When the above described back and forth movement of the gas between the combustion chamber 14 and the exhaust passage 18 is performed repeatedly associated with an occurrence of the stopping failure of the exhaust valve 34 as described above, evaporation of the unburnt fuel adhering to the cylinder wall surface is promoted. It is noted that when the exhaust valve 34 is configured to perform the open/close motion as usual in a case in which a stopping failure occurs in the exhaust valve 34 as with the variable valve operating apparatuses 36 and 38 of the present embodiment, the unburnt fuel is stirred as a result of the gas having vigorously flowed into the cylinder which is under a negative pressure upon occurrence of the stopping failure, and therefore the evaporation of the unburnt fuel is further promoted.

As a result of the above described back and forth movement of the gas being repeatedly performed, the air fuel ratio of the gas moving back and forth keeps on changing to a value of the rich side due to the mixing of evaporated components (such as hydrogen gas) of the unburnt fuel. The air fuel ratio of the gas moving back and forth as described above can be detected by the main A/F sensor 42 disposed at a converging portion in the exhaust manifold 18a.

As so far described, when the stopping failure of the exhaust valve 34 occurs in at least one cylinder in a state where the intake valve 32 of each cylinder is stopped in a normal manner at the time of the fuel cut associated with the valve stop request for the intake and exhaust valves 32 and 34 of all the cylinders, the air fuel ratio of the gas detected by the main A/F sensor 42 keeps on changing unilaterally to a value of the richer side as shown in FIG. 7(C). Meanwhile, in a state where the exhaust valve 34 of each cylinder is stopped in a normal manner, the output of the main A/F sensor 42 does not change throughout before and after the fuel cut, since the above described back and forth movement of the gas does not occur in the exhaust passage 18.

Accordingly, in the present embodiment, if the air fuel ratio of the gas detected by the main A/F sensor 42 is a value richer than a predetermined value, at the time of a fuel cut associated with a valve stop request for the intake and exhaust valves 32 and 34 of all the cylinders, it is arranged to determine that (the stopping operation of the intake valve 32 is normal in the same cylinder and) the stopping operation of the exhaust valve 34 is not performed in a normal manner (that is, a stopping failure has occurred) in at least one cylinder.

Figure 8:
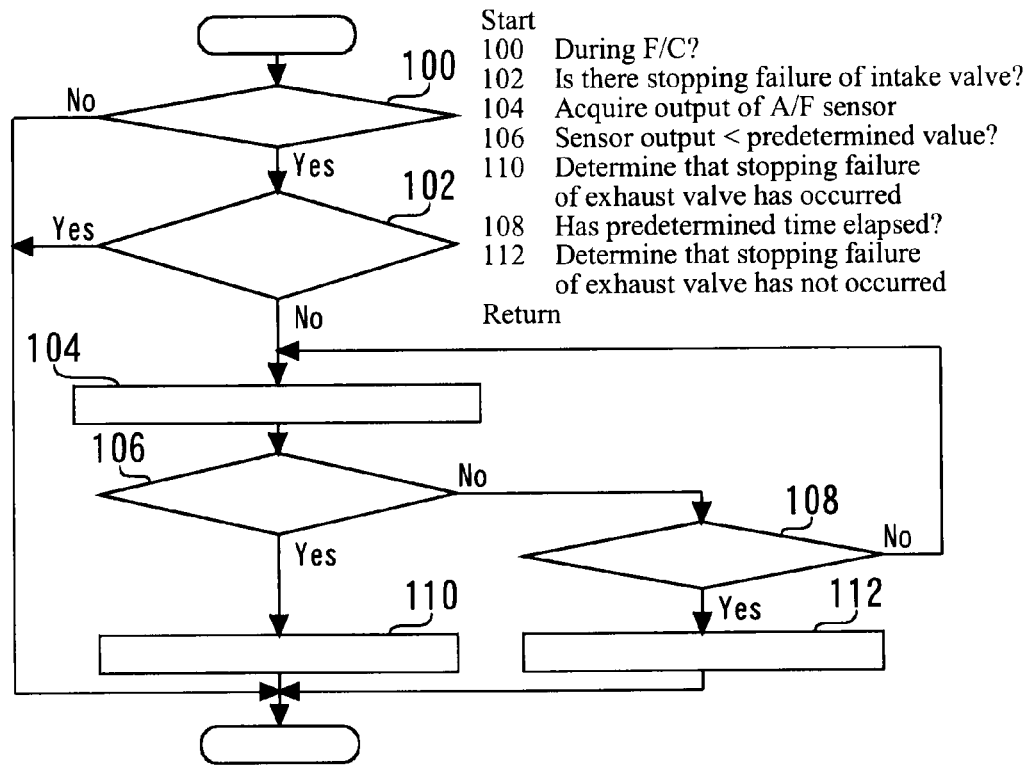
FIG. 8 is a flowchart of a routine that is executed in the first embodiment of the present invention.

FIG. 8 is a flowchart to show the routine to be executed by the ECU 46 in the first embodiment to implement the above described function.

In the routine shown in FIG. 8, first, it is discriminated whether or not a fuel cut (F/C) associated with a valve stop request for the intake and exhaust valves 32 and 34 of all the cylinders is being executed (step 100). If, as a result of that, it is determined that the fuel cut is being executed, then the presence or absence of the stopping failure of the intake valve 32 is discriminated (step 102). As already described with reference to FIG. 7, if the intake valves 32 of all the cylinders are stopped in a normal manner, the intake pipe pressure becomes the atmospheric pressure in a case in which the valve stop request for the intake valve 32 is issued for all the cylinders. Therefore, it is possible to determine the presence or absence of the stopping failure of the intake valve 32 based on whether or not the intake pipe pressure detected by the intake pressure sensor 26 has become the atmospheric pressure during the execution of the fuel cut.

When it is determined that the stopping failure of the intake valve 32 has not occurred in step 102 described above, an output of the main A/F sensor 42 is acquired (step 104). Next, it is discriminated whether or not the acquired output of the main A/F sensor 42 is richer than a predetermined value (step 106). The predetermined value in the present step 106 is a value determined in advance by experiment or the like as a value for allowing the judgment of a rich change of the air fuel ratio associated with the stopping failure of the exhaust valve 34 as already described with reference to FIG. 7. It is noted that the determination method of present step 106 utilizing the output of the main A/F sensor 42 is not limited to that, and may, for example, be one that compares a change amount to the rich side of the sensor output during fuel cut with respect to the output of the main A/F sensor 42 at the time of the execution of the fuel cut with a predetermined value, or one that compares a change rate (change speed) to the rich side of the output of the main A/F sensor 42 after the execution of the fuel cut with a predetermined value.

If it is determined in step 106 described above that the output of the main A/F sensor 42 is not less than the above described predetermined value (is lean), then, it is discriminated whether or not a predetermined time period has elapsed from the time point of the execution of the fuel cut (step 108). The predetermined time period in the present step 108 is a value specified in advance in consideration of the distance from the exhaust valve 34 to the main A/F sensor 42, engine rotational speed, and the like as the time period necessary for judging the presence or absence of the stopping failure of the exhaust valve 34.

When the determination of step 106 described above is negative, and while the predetermined time period has not elapsed in step 108 described above, the processing of steps 104 and 106 described above is repeatedly executed. Then, when it is determined, within the predetermined time period, that the output of the main A/F sensor 42 has become smaller than the above described predetermined value (has become richer) in step 106 described above, it is determined that the stopping failure of the exhaust valve 34 has occurred (that is, the stopping operation of the exhaust valve 34 is not being performed in a normal manner) in at least one cylinder (step 110).

Meanwhile, when the determination of step 106 described above is negative, and if the predetermined time period in step 108 described above has elapsed, it is determined that the stopping failure of the exhaust valve 34 has not occurred (that is, the stopping operation of the exhaust valve 34 is being performed in a normal manner) in each cylinder (step 112).

According to the routine shown in FIG. 8 and described so far, it is possible to determine the presence or absence of the stopping failure of the exhaust valve 34 based on the output of the main A/F sensor 42 during the fuel cut associated with the valve stop request for the intake and exhaust valves 32 and 34 of all the cylinders. Moreover, according to the abnormality determination method of the present embodiment, it is possible to determine the presence or absence of the stopping failure of the exhaust valve 34 by using the existing main A/F sensor 42, which is provided for the air fuel ratio control, without using a dedicated sensor for abnormality detection.

Further, when it is determined that the stopping operation of the intake valve 32 is normal, the rate of the air flow passing from inside the cylinder to the main A/F sensor 42 does not change since fresh air does not flow into the cylinder via the intake valve 32. Therefore, it is possible to perform the abnormality determination with a high accuracy by determining the presence or absence of an abnormality of the stopping operation of the exhaust valve 34 according to the air fuel ratio when it is determined that the stopping operation of the intake valve 32 is normal. Further, according to the method of the present embodiment, there is no need of temporarily opening and closing the intake and exhaust valves 32 and 34 during the fuel cut for the detection of abnormality of the valve train. For this reason, the abnormality determination of the exhaust valve 34 becomes possible without a risk of fresh-air inflow to the catalyst 40 associated with the execution of the abnormality determination processing.

By the way, in the first embodiment, which has been described above, it is arranged to determine the presence or absence of the stopping failure of the exhaust valve 34 based on whether or not the output of the main A/F sensor 42 has changed to the rich side at the time of a fuel cut associated with a valve stop request for the intake and exhaust valves 32 and 34 of all the cylinders. However, the determination of the stopping failure of the exhaust valve 34 in the present invention is not limited to those which are performed at the time of the fuel cut associated with the valve stop request for the intake and exhaust valves 32 and 34 of all the cylinders, and may be those which are performed at the time of a reduced-cylinder operation associated with a valve stop request for the exhaust valve 34 of at least one cylinder, but not all the cylinders (or, the intake valve 32 of at least one cylinder, but not all the cylinders as well as that).

Figure 9:
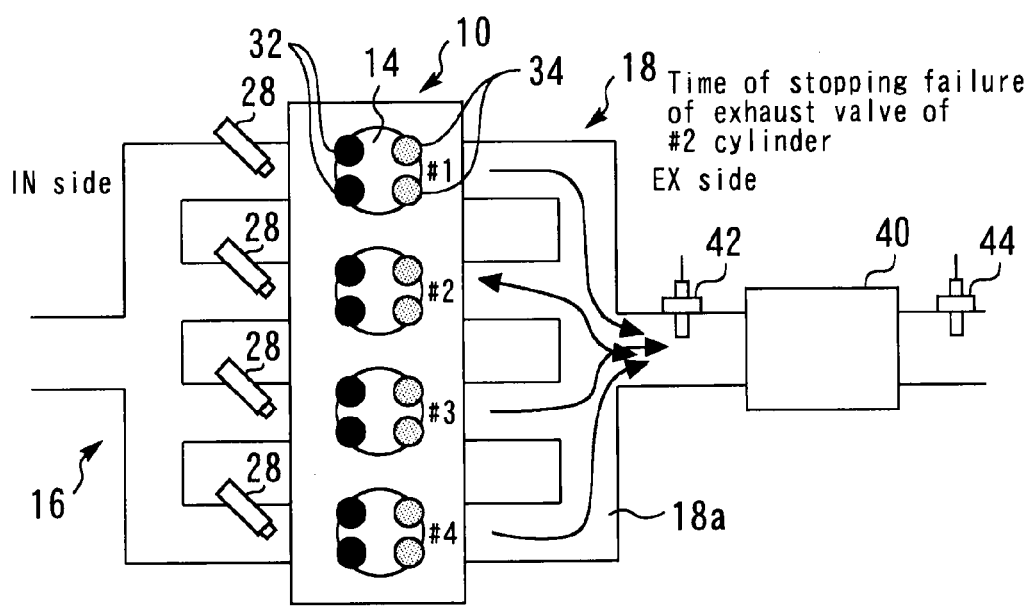
FIG. 9 is a diagram to represent the flow of gas when a stopping failure of the exhaust valve of No. 2 cylinder occurs at the time of a reduced-cylinder operation in which the operation of No. 2 cylinder is halted.

FIG. 9 is a diagram to represent the flow of gas when the stopping failure of the exhaust valve 34 of No. 2 cylinder occurs at the time of a reduced-cylinder operation in which the operation of No. 2 cylinder is halted.

For example, in a case where a valve stop request for the intake and exhaust valves 32 and 34 is issued for No. 2 cylinder, if it is assumed that the stopping failure occurs in the exhaust valve 34 of the No. 2 cylinder, rich gas including evaporated components of unburnt fuel moves back and forth between the inside of the cylinder and the exhaust manifold 18a as shown in FIG. 9. Then, as a result of the gas converging with the exhaust gas discharged from other cylinders, the exhaust gas to be detected by the main A/F sensor 42 becomes richer compared with the gas when the stopping failure has not occurred. Therefore, even at the time of the reduced-cylinder operation, the presence or absence of the stopping failure of the exhaust valve 34 may be determined based on whether or not the output of the main A/F sensor 42 has changed to the rich side.

Moreover, when performed at the time of the reduced-cylinder operation as described above, the presence or absence of the stopping failure of the exhaust valve 34 may be judged based on the presence or absence of a change to the increasing side of a decrease correction amount of a fuel injection amount which cancels the rich change of the sensor output (a rich change of the air fuel ratio) (specifically based on whether or not an absolute value or a change rate of the decrease correction amount is not less than a predetermined value) in place of judging whether or not the output of the main A/F sensor 42 has unilaterally changed to the rich side. More specifically, in the system of the present embodiment, a feedback control to adjust the fuel injection amount is executed such that the air fuel ratio of exhaust gas in the upstream of the catalyst 40 is a predetermined control air fuel ratio (such as theoretical air fuel ratio) by utilizing the output of the main A/F sensor 42. If the above described feedback control is executed under a situation in which the stopping failure of the exhaust valve 34 has occurred at the time of reduced-cylinder operation associated with a valve stop request for the intake and exhaust valves 32 and 34 of some of the cylinders, a decrease correction of a fuel injection amount is performed such that a rich output to be detected by the main A/F sensor 42 associated with the occurrence of the stopping failure of the exhaust valve 34 is cancelled. In such a case, it becomes unable to detect a unilateral change to the rich side of the sensor output associated with the stopping failure of the exhaust valve 34. Accordingly, when the above described feedback control is executed at the time of a reduced-cylinder operation, the presence or absence of stopping failure of the exhaust valve 34 may be judged based on the presence or absence of a change to the increasing side of the decrease correction amount of the fuel injection amount which cancels the rich change of the above described sensor output.

Moreover, in the first embodiment, which has been described above, when it is determined that closing and stopping of the intake valve 32 is performed in a normal manner, and besides the air fuel ratio of the gas detected by the main A/F sensor 42 is richer than the predetermined value, it is arranged to determine that the stopping failure of the exhaust valve 34 has occurred. If it is supposed that the stopping failure has occurred in the intake valve 32 as well as in the exhaust valve 34 in the same cylinder at the time of the fuel cut associated with the valve stop request for the intake and exhaust valves 32 and 34 of all the cylinders, the gas to be discharged from the cylinder involved with stopping failure becomes a lean gas close to fresh air. For this reason, it is possible to distinguish between such a stopping failure of both valves and a stopping failure of the exhaust valve 34 alone according to the detection result of the air fuel ratio. Thus, at the time of the fuel cut associated with the valve stop request for the intake and exhaust valves 32 and 34 of all the cylinders, it is not necessary to execute the determination of the presence or absence of the stopping failure of the intake valve 32 prior to the determination of the presence or absence of the stopping failure of the exhaust valve 34. Moreover, at the time of the fuel cut associated with the valve stop request for the intake and exhaust valves 32 and 34 of all the cylinders, or at the time of the reduced-cylinder operation associated with the valve stop request for the intake and exhaust valves 32 and 34 of some of the cylinders, it may be arranged to determine that the stopping failure has occurred at the intake valve 32 as well as at the exhaust valve 34 in the same cylinder by determining that the air fuel ratio to be detected by the main A/F sensor 42 is leaner than a predetermined value (or by determining that there is a change to the increasing side of an increase correction amount of a fuel injection amount which cancels a lean change of the sensor output).

Further, in the first embodiment, which has been described above, it is arranged to determine the presence or absence of the stopping failure of the intake valve 32 based on the intake pressure. However, in the present invention, the determination of the presence or absence of the stopping operation of the intake valve at the time of the fuel cut associated with the valve stop request for the intake and exhaust valves of all the cylinders is not limited to such a method. For example, it may be arranged to determine that the stopping operation of the intake valve 32 is normal when an intake air flow rate is not detected by the air flow meter 20. Alternatively, it may be arranged to provide a valve sensor for detecting the presence or absence of the open/close motion of the intake valve 32 (for example, a lift sensor (not shown) for detecting a lift of the intake valve 32) and to determine the presence or absence of the stopping failure of the intake valve 32 based on the output of the valve sensor.

Moreover, in the first embodiment, which has been described above, it is arranged to determine the presence or absence of the stopping failure of the exhaust valve 34 by utilizing the output of the main A/F sensor 42 disposed in the converging portion of the exhaust passage 18 (the exhaust manifold 18a). However, the position for disposing the air fuel ratio sensor in the present invention is not limited to the above described position, provided that it is a position which allows the detection of the air fuel ratio of the gas that moves back and forth between the inside the cylinder and the exhaust passage 18 in association with the stopping failure of the exhaust valve 34. For example, it may be arranged to provide an air fuel ratio sensor for each cylinder in a region before the convergence of the gas from each cylinder in the exhaust manifold 18a and to determine the presence or absence of the stopping failure of the exhaust valve 34 for each cylinder.

It is noted that in the first embodiment, which has been described above, the valve stop mechanism 76 included in the exhaust variable valve operating apparatus 38 corresponds to the "exhaust valve stop mechanism" according to the first, fifth or eighth aspect of the present invention, and the main A/F sensor 42 corresponds to the "air fuel ratio sensor" according to the first, fifth or eighth aspect of the present invention. Moreover, the "discrimination means" according to the first aspect of the present invention is implemented by the ECU 46 executing the processing of steps 104 to 108 described above when the determination of step 100 is positive, and the "exhaust valve abnormality determination means" according to the first aspect of the present invention is implemented by the ECU 46 executing the processing of step 110 described above.

Further, the valve stop mechanism 76 included in the intake variable operating valve apparatus 36 corresponds to the "intake valve stop mechanism" according to the second, sixth or eighth aspect of the present invention.

Furthermore, the "intake valve abnormality determination means" according to the third aspect of the present invention is implemented by the ECU 46 executing the processing of step 102 described above.

Second Embodiment

Next, a second embodiment of the present invention will be described with reference to FIGS. 10 and 11.

In the present embodiment, description will be made on the control which is suitable in a case in which the internal combustion engine 10 shown in FIG. 1 is applied to a hybrid vehicle including a driving system 100 as shown below.

[Configuration of Hybrid System]

Figure 10:
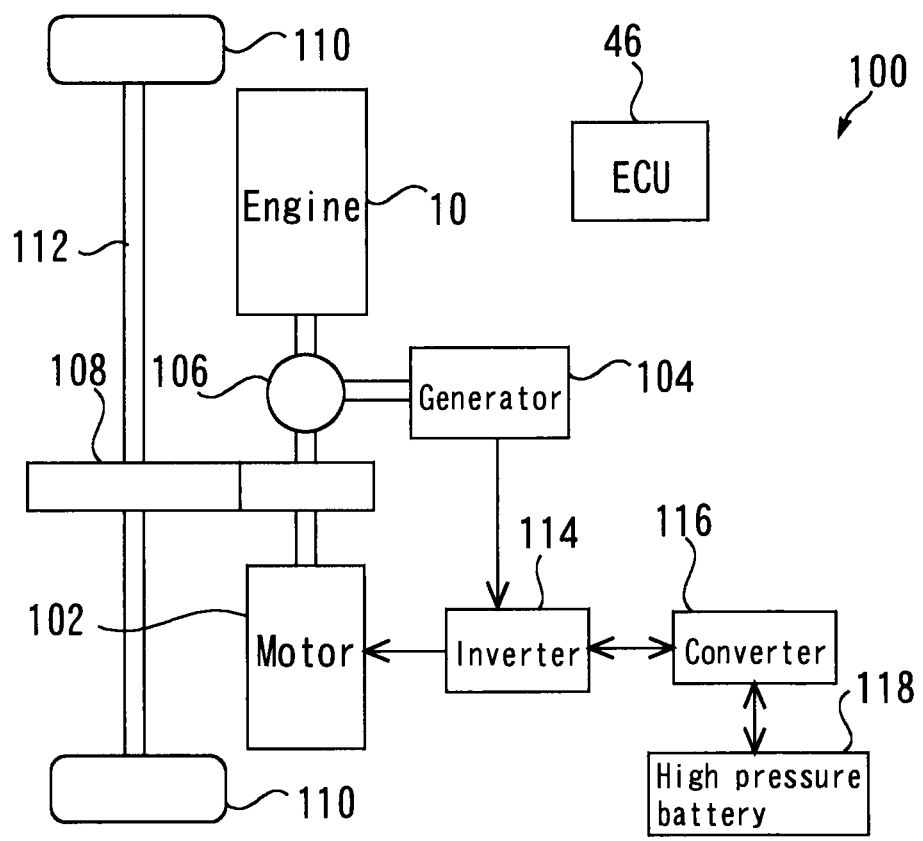
FIG. 10 is a diagram to show an outline configuration of a driving system of a hybrid vehicle to which the present invention is applied.

FIG. 10 is a diagram to show an outline configuration of a driving system 100 of a hybrid vehicle to which the present invention is applied. This driving system 100 includes an internal combustion engine 10 and a motor for driving the vehicle (hereafter, simply referred to as a "motor") 102 as the power source for the vehicle. Moreover, the driving system 100 also includes a generator 104 that receives the supply of driving force to generate electric power. The internal combustion engine 10, the motor 102, and the generator 104 are interlinked via a power split mechanism 106 of planetary gear type. A speed reducer 108 is connected to the rotating shaft of the motor 102 in connection with the power split mechanism 106. The speed reducer 108 links the rotating shaft of the motor 102 with a driving shaft 112 in connection with a driving wheel 110. The power split mechanism 106 is an apparatus to split the driving force of the internal combustion engine 10 into the generator 104 side and the speed reducer 108 side. The distribution of the driving force by the power split mechanism 106 can be freely changed.

The driving system 100 further includes an inverter 114, a converter 116, and a high voltage battery 118. The inverter 114 is connected to the generator 104 and the motor 102, and is also connected to the high voltage battery 118 via the converter 116. The electric power generated at the generator 104 can be supplied to the motor 102 via the inverter 114, and also can be charged to the high voltage battery 118 via the inverter 114 and the converter 116. Moreover, the electric power charged in the high voltage battery 118 can be supplied to the motor 102 via the converter 116 and the inverter 114.

According to the driving system 100 as so far described, based on a predetermined condition, the driving wheel 110 can be rotated by the driving force of the internal combustion engine 10 alone with the motor 102 being stopped, and conversely the driving wheel 110 can be rotated by the driving force of the motor 102 alone with the internal combustion engine 10 being stopped. Moreover, it is also possible to activate both of the motor 102 and the internal combustion engine 10 and to rotate the driving wheel 110 by both the driving forces. Further, it is also possible to drive the internal combustion engine 10 by energizing the generator 104.

The driving system 100 of the present embodiment is controlled by the above described ECU 46. The ECU 46 comprehensively controls the entire driving system 100 including the internal combustion engine 10, the motor 102, the generator 104, the power split mechanism 106, the inverter 114, the converter 116, and the like.

[Characteristic Control of Second Embodiment]

In a hybrid vehicle, even in a state where the operation of the internal combustion engine 10 is stopped, the vehicle can be driven by the motor 102 as described above. Thus, even at the time of a fuel cut associated with a valve stop request for the intake and exhaust valves 32 and 34 of all the cylinders, it is possible to continue the running of the vehicle by the motor 102 while quickly decreasing the engine rotational speed to zero by arranging that the internal combustion engine 10 is not rotated by the driving wheel 110. However, the determination method of the stopping failure of the exhaust valve 34 explained in the first embodiment described above is performed by detecting rich gas that leaks out from the cylinder in which the stopping failure of the exhaust valve 34 has occurred, and if the engine rotational speed becomes zero, the back and forth movement of the above described rich gas between the inside of the cylinder and the exhaust passage 18 facilitated by the reciprocating movement of the piston 12 does not occur. For this reason, when the rotation of the internal combustion engine 10 is stopped, even if it is stopped with the exhaust valve 34 being opened in the cylinder in which the stopping failure has occurred, it is very difficult to detect the above described rich gas by the main A/F sensor 42.

Accordingly, in the system of the present embodiment which is applied to the hybrid vehicle, at the time of the fuel cut associated with the valve stop request for the intake and exhaust valves 32 and 34 of all the cylinders, it is arranged to prohibit the stopping of rotation of the internal combustion engine 10 (in other words, it is arranged to allow the rotation of the internal combustion engine 10 to continue) until the processing to detect the stopping failure of the exhaust valve 34 is completed.

FIG. 11 is a flowchart to show the routine to be executed by the ECU 46 in the second embodiment to implement the above described function. It is noted that in FIG. 11, the same steps as those shown by FIG. 8 in the first embodiment will be assigned with the same reference numeral to omit or simplify the description thereof.

In the routine shown in FIG. 11, when it is determined in step 100 that a fuel cut is being executed, the processing to prohibit the stopping of the rotation of the internal combustion engine 10 is executed (step 200). Specifically, the processing to drive the crankshaft 48 by utilizing the generator 104 is executed such that the engine rotational speed is maintained at a predetermined rotational speed. It is noted that in present step 200, the method for maintaining the engine rotational speed so as not to become zero is not limited to the method that utilizes the generator 104, but may be implemented, for example, by controlling the power split mechanism 106 such that the crankshaft 48 is rotated by the driving wheel 110 of the vehicle which continues to be running.

Thereafter, in the present routine, as a result of the determination in step 110 that the stopping failure of the exhaust valve 34 is present, or as a result of that the predetermined time period of step 108 has elapsed without the stopping failure of the exhaust valve 34 being recognized, the stopping of the rotation of the internal combustion engine 10 is permitted after the processing to detect the stopping failure of the exhaust valve 34 is completed (step 202). As a result of this, the engine rotational speed is quickly decreased to zero.

According to the routine shown in FIG. 11 described above, in the hybrid vehicle which can keep the vehicle running in a state where the internal combustion engine 10 is stopped at the time of the fuel cut of all the cylinders, it becomes possible to reliably secure a chance to diagnose the stopping failure of the exhaust valve 34 at the time of the fuel cut associated with the valve stop request for the intake and exhaust valves 32 and 34 of all the cylinders.

It is noted that in the second embodiment, which has been described above, the "engine rotation maintaining means" according to the fourth aspect of the present invention is implemented by the ECU 46 executing the processing of step 200 described above.

Third Embodiment

Next, a third embodiment of the present invention will be described with reference to FIG. 12.

The system of the present embodiment can be implemented by using the hardware configuration shown in FIG. 1 and making the ECU 46 execute the routine shown in FIG. 12 described below, in place of the routine shown in FIG. 8.

The present embodiment addresses the determination of the presence or absence of the stopping failure of the exhaust valve 34 at the time of a reduced-cylinder operation associated with a valve stop request for the intake and exhaust valves 32 and 34 of some of the cylinders. Under a situation in which the stopping failure of the exhaust valve 34 has occurred at the time of such reduced-cylinder operation, when the feedback control of the air fuel ratio is being executed as already described above, a decrease correction of the fuel injection amount is performed such that the rich output to be detected by the main A/F sensor 42 associated with the occurrence of the stopping failure of the exhaust valve 34 is cancelled. As a result of that, it becomes unable to detect a unilateral change to the rich side of the sensor output associated with the stopping failure of the exhaust valve 34, by using the main A/F sensor 42.

Accordingly, in the present embodiment, at the time of the reduced-cylinder operation associated with the valve stop request for the intake and exhaust valves 32 and 34 of some of the cylinders, it is arranged to prohibit the feedback control of the air fuel ratio (fuel injection amount) by using the main A/F sensor 42 (and further the sub $O_2$ sensor 44) until the processing to detect the stopping failure of the exhaust valve 34 is completed.

FIG. 12 is a flowchart of the routine to be executed by the ECU 46 in the third embodiment to implement the above described function. It is noted that in FIG. 12, the same steps as those shown by FIG. 8 in the first embodiment will be assigned with the same reference numeral to omit or simplify the description thereof.

In the routine shown in FIG. 12, first, it is discriminated whether or not it is at the time of a reduced-cylinder operation associated with a valve stop request for the intake and exhaust valves 32 and 34 of some of the cylinders (step 300). If, as a result of that, it is determined that it is during the reduced-cylinder operation, then the execution of the feedback control of the air fuel ratio is prohibited (halted) (step 302).

Next, the presence or absence of a stopping failure of the intake valve 32 is discriminated (step 304). The determination of present step 304 at the time of the reduced-cylinder operation can be performed, for example, based on the output of the valve sensor already described. Moreover, the processing to determine the stopping failure of the exhaust valve 34 in steps 104 to 112 after the determination of present step 304 is positive is the same as the processing of the routine shown in FIG. 8 described above. In the present routine, the execution of the feedback control of the air fuel ratio is permitted after it is determined in step 112 that the stopping failure of the exhaust valve 34 has not occurred (step 306).

According to the routine shown in FIG. 12 described so far, it becomes possible to reliably secure a chance to diagnose the stopping failure of the exhaust valve 34 by using the output of the main A/F sensor 42 without being influenced by the feedback control of the air fuel ratio at the time of the reduced-cylinder operation associated with the valve stop request for the intake and exhaust valves 32 and 34 of some of the cylinders.

Further, according to the routine described above, when it is determined that the stopping failure of the intake valve 32 has not occurred during the reduced-cylinder operation associated with the valve stop request for the intake and exhaust valves 32 and 34 of some of the cylinders, the determination of the stopping failure of the exhaust valve 34 is performed. Here, it is assumed that the valve stop request for the intake and exhaust valves 32 and 34 is issued for two cylinders at the time of the reduced-cylinder operation, the stopping failure has occurred at the intake valve 32 alone in one of the two cylinders, and the stopping failure has occurred at the exhaust valve 34 alone in the other cylinder. In such a case, unlike the time of the fuel cut for all the cylinders where there are no operating cylinders, it is considered that the air fuel ratio of the exhaust gas discharged from other operating cylinders may be influenced by the presence of the cylinder in which a stopping failure has occurred only at the intake valve 32. Therefore, in the case of the reduced-cylinder operation, it becomes possible to accurately determine the stopping failure of the exhaust valve 34 without being influenced by the change of the air fuel ratio of other operating cylinders associated with the occurrence of the stopping failure of the intake valve 32 by arranging that the stopping failure of the intake valve 32 is determined prior to determining the stopping failure of the exhaust valve 34 as in the processing of the above described routine.

In further addition to that, according to the method for determining the stopping failure of the exhaust valve 34 of the present embodiment which is performed during the reduced-cylinder operation associated with the valve stop request for the intake and exhaust valves 32 and 34 of some of the cylinders, there is no need of temporarily opening and closing the intake and exhaust valves 32 and 34 of the cylinders for which the valve stop request is issued for detecting abnormality of the valve train, during the reduced-cylinder operation. As a result of this, it becomes possible to detect abnormality of the exhaust valve 34 without causing the deterioration of drivability of the internal combustion engine 10 associated with the execution of abnormality detection processing.

It is noted that in the third embodiment, which has been described above, the "discrimination means" according to the fifth or eighth aspect of the present invention is implemented by the ECU 46 executing the processing of steps 104 to 108 described above when the determination of step 300 described above is positive, and the "exhaust-valve abnormality determination means" according to the fifth or eighth aspect of the present invention is implemented by the ECU 46 executing the processing of step 110 described above.

Moreover, the "intake-valve abnormality determination means" according to the seventh or eighth aspect of the present invention is implemented by the ECU 46 executing the processing of step 304 described above.

Further, the "feedback control prohibition means" according to the ninth aspect of the present invention is implemented by the ECU 46 executing the processing of step 302 described above.

Fourth Embodiment

Next, a fourth embodiment of the present invention will be described with reference to FIG. 13.

The system of the present embodiment can be implemented by using the hardware configuration shown in FIG. 1 and making the ECU 46 execute the routine shown in FIG. 13 described below, in place of the routine shown in FIG. 12.

The present embodiment addresses the determination of the presence or absence of a stopping failure of the exhaust valve 34 at the time of a reduced-cylinder operation associated with a valve stop request for the intake and exhaust valves 32 and 34 of a plurality of, but not all of the cylinders. When the stopping failure has occurred at the exhaust valves 34 of a plurality of cylinders in such a reduced-cylinder operation, as the number of cylinders involved with stopping failure increases, the time needed for the output of the main A/F sensor 42 to reach a predetermined value for determining the stopping failure of the exhaust valve 34 from the start of the reduced-cylinder operation decreases.

Accordingly, in the present embodiment, it is arranged to determine that as the time needed for the output of the main A/F sensor 42 to reach the above described predetermined value decreases (that is, as the change rate to the rich side of the air fuel ratio of the gas detected by the main A/F sensor 42 increases) at the time of the reduced-cylinder operation associated with the valve stop request for the intake and exhaust valves 32 and 34 of the plurality of, but not all of the cylinders, the number of cylinders involved with stopping failure of the exhaust valve 34 increases.

FIG. 13 is a flowchart of the routine to be executed by the ECU 46 in the fourth embodiment to implement the above described function. It is noted that in FIG. 13, the same steps as those shown by FIG. 12 in the third embodiment will be assigned with the same reference numeral to omit or simplify the description thereof.

In the routine shown in FIG. 13, when it is determined that a stopping failure of the exhaust valve 34 has occurred in association with determining that the output of the main A/F sensor 42 is smaller (richer) than the predetermined value (steps 106 and 110), then, the processing of step 400 is executed.

In present step 400, a time needed for the output of the main A/F sensor 42 to reach the above described predetermined value for the determination of the stopping failure of the exhaust valve 34 is acquired, and in addition to that, the number of cylinders involved with the stopping failure of the exhaust valve 34 is determined according to the reaching time. The ECU 46 stores a map (not shown) in which the number of cylinders involved with the stopping failure of the exhaust valve 34 is predetermined by experiment or the like in relation to the reaching time and the engine rotational speed. In this map, it is specified that as the above described reaching time decreases, the number of the cylinders involved with stopping failure of the exhaust valve 34 increases. Moreover, since as the engine rotational speed increases, the number of reciprocation of the piston 12 per unit time increases, the back and forth movement of the gas between the inside of the cylinder and the exhaust passage 18 in the cylinder involved with the stopping failure of the exhaust valve 34 becomes more vigorous. As a result, enrichment of gas is further promoted. For this reason, in the above described map, the number of cylinders involved with stopping failure of the exhaust valve 34 is specified in relation to the above described reaching time taking consideration of the engine rotational speed during the reduced-cylinder operation.

According to the routine shown in FIG. 13 described so far, it becomes possible to determine the number of cylinders involved with stopping failure of the exhaust valve 34 based on the time needed for the output of the main A/F sensor 42 to reach the above described predetermined value at the time of the reduced-cylinder operation associated with the valve stop request for the intake and exhaust valves 32 and 34 of the plurality of, but not all of the cylinders.

By the way, in the fourth embodiment, which has been described above, it is arranged to determine the number of cylinders involved with stopping failure of the exhaust valve 34 based on the time needed for the output of the main A/F sensor 42 to reach the above described predetermined value. The present invention is, however, not limited to that, and it may be arranged to determined that as the time needed for a decrease correction amount of a feedback control of the air fuel ratio to reach a predetermined value decreases at the time of the above described reduced-cylinder operation (that is, the change rate to the increasing side of the decrease correction amount at the time of the reduced-cylinder operation increases), the number of cylinders in which the stopping operation of the exhaust valve is not performed in a normal manner further increases.

Moreover, in the fourth embodiment, which has been described above, description has been made on the method for determining the number of cylinders involved with stopping failure of the exhaust valve 34 targeting for the time of the reduced-cylinder operation associated with the valve stop request for the intake and exhaust valves 32 and 34 of the plurality of, but not all of the cylinders. However, the method for determining the number of cylinders involved with stopping failure of the exhaust valve 34 of the present embodiment is similarly applicable to the time of a fuel cut associated with a valve stop request for the intake and exhaust valves 32 and 34 of all the cylinders as in the first embodiment described above.

It is noted that in the fourth embodiment, which has been described above, the "change rate acquisition means" and the "number-of-exhaust-valve-abnormality-cylinder determination means" according to the eleventh aspect of the present invention are implemented by the ECU 46 executing the processing of step 400 described above.

Fifth Embodiment

Next, a fifth embodiment of the present invention will be described with reference to FIG. 14.

The system of the present embodiment can be implemented by using the hardware configuration shown in FIG. 1 and making the ECU 46 execute the routine shown in FIG. 14 described below, in place of the routine shown in FIG. 12.

The present embodiment, as well as the fourth embodiment, addresses the determination of the presence or absence of a stopping failure of the exhaust valve 34 at the time of a reduced-cylinder operation associated with a valve stop request for the intake and exhaust valves 32 and 34 of a plurality of, but not all of the cylinders. In a case where the stopping failure has occurred at the exhaust valves 34 of the plurality of cylinders at the time of such reduced-cylinder operation, the output of the main A/F sensor 42 changes more greatly to the rich side within a predetermined time period after the start of the reduced-cylinder operation as the number of cylinders involved with stopping failure increases.

Accordingly, in the present embodiment, it is arranged to determine that with an increase of the change amount to the rich side of the output of the main A/F sensor 42 in a predetermined time period after the start of the reduced-cylinder operation associated with the valve stop request for the intake and exhaust valves 32 and 34 of the plurality of, but not all of the cylinders (that is, with a further increase of the change rate to the rich side of the air fuel ratio of the gas detected by the main A/F sensor 42), the number of cylinders involved with stopping failure of the exhaust valve 34 increases.

FIG. 14 is a flowchart of the routine to be executed by the ECU 46 in the fifth embodiment to implement the above described function. It is noted that in FIG. 14, the same steps as those shown by FIG. 12 in the third embodiment will be assigned with the same reference numeral to omit, or simplify the description thereof.

In the routine shown in FIG. 14, it is discriminated whether or not a predetermined time period has elapsed from the start point of current reduced-cylinder operation associated with the valve stop request for the intake and exhaust valves 32 and 34, during the reduced-cylinder operation (step 500). When the above described predetermined time period has elapsed, the output of the main A/F sensor 42 is acquired (step 104), and thereafter it is discriminated whether or not the sensor output is richer than a predetermined value (step 502). The predetermined value in present step 502 is specified as a value which enables the determination of whether or not a stopping failure of the exhaust valve 34 has occurred in any one of the cylinders.

When the determination of step 502 described above is positive, it is determined that the stopping failure of the exhaust valve 34 has occurred in at least one cylinder (step 110), and thereafter the number of cylinders involved with stopping failure of the exhaust valve 34 is determined according to the level of the output of the main A/F sensor 42 (step 504). Specifically, the number of cylinders involved with stopping failure of the exhaust valve 34 is determined according to the change amount to the rich side of the output of the main A/F sensor 42 in the above described predetermined time period after the start of the reduced-cylinder operation. The ECU 46 stores a map (not shown) in which the number of cylinders involved with stopping failure of the exhaust valve 34 is predetermined by experiment or the like in relation to the change amount and the engine rotational speed. In this map, it is specified that as the above described change amount increases, the number of cylinders involved with stopping failure of the exhaust valve 34 increases. Moreover, the reason why the engine rotational speed is taken into consideration is similar as in the fourth embodiment described above.

According to the routine shown in FIG. 14 described so far, it becomes possible to determine the number of cylinders involved with stopping failure of the exhaust valve 34 based on the change amount to the rich side of the output of the main A/F sensor 42 in the predetermined time period after the start of the reduced-cylinder operation at the time of the reduced-cylinder operation associated with the valve stop request for the intake and exhaust valves 32 and 34 of the plurality of, but not all of the cylinders.

By the way, in the fifth embodiment, which has been described above, it is arranged to determine the number of cylinders involved with stopping failure of the exhaust valve 34 based on the change amount to the rich side of the output of the main A/F sensor 42 in the predetermined time period after the start of the reduced-cylinder operation. The present invention is, however, not limited to that, and it may be arranged to determine that with a further increase of the change amount to the increasing side of the decrease correction amount of the feedback control of the air fuel ratio in the above described predetermined time period at the time of the above described reduced-cylinder operation (that is, with an increase of the change rate to the increasing side of the decrease correction amount at the time of reduced-cylinder operation), the number of cylinders in which the stopping operation of the exhaust valve is not performed in a normal manner further increases.

Moreover, in the fifth embodiment, which has been described above, description has been made on the method for determining the number of cylinders involved with stopping failure of the exhaust valve 34 targeting for the time of the reduced-cylinder operation associated with the valve stop request for the intake and exhaust valves 32 and 34 of the plurality of, but not all of the cylinders. However, the method for determining the number of cylinders involved with stopping failure of the exhaust valve 34 of the present embodiment is similarly applicable to the time of a fuel cut associated with a valve stop request for the intake and exhaust valves 32 and 34 for all the cylinders as in the first embodiment described above.

It is noted that in the fifth embodiment, which has been described above, the "change rate acquisition means" and the "number-of-exhaust-valve-abnormality-cylinder determination means" according to the eleventh aspect of the present invention are implemented by the ECU 46 executing the processing of step 504 described above.

Sixth Embodiment

Next, a sixth embodiment of the present invention will be described with reference to FIG. 15.

The system of the present embodiment can be implemented by using the hardware configuration shown in FIG. 1 and making the ECU 46 execute the routine shown in FIG. 15 described below, in place of the routine shown in FIG. 12.

The present embodiment, as well as the fourth embodiment, addresses the determination of the presence or absence of stopping failure of the exhaust valve 34 at the time of a reduced-cylinder operation associated with a valve stop request for the intake and exhaust valves 32 and 34 of a plurality of, but not all of the cylinders. More specifically, the present embodiment is characterized in that when a stopping failure of the exhaust valve 34 occurs at the time of the reduced-cylinder operation, the cylinder where the stopping failure of the exhaust valve 34 has occurred is identified based on the timing at which gas arrives at the main A/F sensor 42, which is disposed at the converging portion of the exhaust manifold 18*a*, from each cylinder.

FIG. 15 is a flowchart of the routine to be executed by the ECU 46 in the sixth embodiment to implement the above described function. It is noted that in FIG. 15, the same steps as those shown by FIG. 12 in the third embodiment will be assigned with the same reference numeral to omit or simplify the description thereof.

The point in the routine shown in FIG. 15 that it is determined that the stopping failure of the exhaust valve 34 of at least one cylinder has occurred in association with determining that the output of the main A/F sensor 42 is richer than a predetermined value is the same as that in the routine shown in FIG. 12 described above. In addition to that, in the present routine, when the occurrence of a stopping failure of the exhaust valve 34 is recognized, the cylinder where the stopping failure of the exhaust valve 34 has occurred is identified, as described above, based on the timing at which gas arrives at the main A/F sensor 42 from each cylinder (step 600).

Gas from each cylinder arrives in a regular manner at the main A/F sensor 42, which is disposed at the converging portion of the exhaust manifold 18*a*, as the exhaust valve 34 of each cylinder opens in a predetermined order (the combustion order). This applies not only to the exhaust gas that arrives from the cylinder in operation but also to the rich gas that arrives from the cylinder in which the stopping failure of the exhaust valve 34 has occurred, at the time of the reduced-cylinder operation. The distance from each cylinder to the main A/F sensor 42 is known, and the flow rate of gas that is discharged from each cylinder is proportional to the engine rotational speed. Therefore, if the main A/F sensor 42 has an excellent responsiveness, it is possible to grasp from which cylinder the gas, whose output is detected by the sensor 42, has been discharged based on the timing at which gas arrives at the main A/F sensor 42 from each cylinder. Accordingly, in present step 600, the processing to identify the cylinder where the stopping failure of the exhaust valve 34 has occurred is executed based on the timing at which rich gas arrives at the main A/F sensor 42.

According to the routine shown in FIG. 15 described so far, it becomes possible to identify the cylinders where the stopping failure of the exhaust valve 34 has occurred when the stopping failure occurs at the exhaust valves 34 of a plurality of cylinders, at the time of the reduced-cylinder operation associated with the valve stop request for the intake and exhaust valves 32 and 34 of the plurality of, but not all of the cylinders.

By the way, in the sixth embodiment, which has been described above, description has been made on the method for identifying the cylinder involved with stopping failure of the exhaust valve 34 targeting for the time of the reduced-cylinder operation associated with the valve stop request for the intake and exhaust valves 32 and 34 of the plurality of, but not all of the cylinders. However, the method for identifying the cylinder involved with stopping failure of the exhaust valve 34 of the present embodiment is similarly applicable to the time of a fuel cut associated with a valve stop request for the intake and exhaust valves 32 and 34 of all the cylinders as in the first embodiment described above. Moreover, at the time of the fuel cut, it is possible to identify the cylinder involved with stopping failure of the exhaust valve 34 by a method described below in place of the technique of the sixth embodiment described above.

That is, when there is a cylinder where a stopping failure of the exhaust valve 34 has occurred at the time of the above mentioned fuel cut, pumping loss in the cylinder where the stopping failure has occurred becomes larger than that of other normal cylinders (the cylinders in which the intake and exhaust valves 32 and 34 are both in the valve closed state). Thus, when the engine rotational speed decreases as the fuel cut is performed, periodic sharp changes appear in the output of the crank angle sensor 50 due to the influence of the above described cylinder where the stopping failure has occurred. Accordingly, first, it is determined that a stopping failure has not occurred at the intake valve 32 of each cylinder, and thereafter the presence or absence of a stopping failure of the exhaust valve 34 is determined by the determination of whether or not the output of the main A/F sensor 42 is rich. Then, when it is determined that the stopping failure of the exhaust valve 34 has occurred, the cylinder where the stopping failure has occurred is identified from the timing of the above described sharp change that has appeared on the output of the crank angle sensor 50. According to such method, in an internal combustion engine having a large number of cylinders, it becomes possible to suitably identify cylinders where a stopping failure of an exhaust valve has occurred, in a case where it is difficult to identify whether the cylinder involved with stopping failure is the intake side or the exhaust side only from the output of the crank angle sensor due to the fact that the valve open period of the exhaust valve of a cylinder overlaps with the valve open period of an intake valve of another cylinder.

It is noted that in the sixth embodiment, which has been described above, the "rich cylinder discrimination means" and the "exhaust valve abnormality cylinder identification means" according to the twelfth aspect of the present invention are implemented by the ECU 46 executing the processing of step 600 described above.

The invention claimed is:

1. A control apparatus for an internal combustion engine including a valve stop mechanism, the control apparatus comprising:
    an exhaust valve stop mechanism to change an operation state of an exhaust valve between a valve operating state and a valve closed and stopped state, the exhaust valve being provided in all cylinders of an internal combustion engine including at least one cylinder;
    an intake valve stop mechanism to change an operation state of an intake valve between a valve operating state and a valve closed and stopped state, the intake valve being provided in all the cylinders;
    an intake valve abnormality determination circuit which determines a presence or absence of an abnormality of a stopping operation of the intake valve by the intake valve stop mechanism;
    an air fuel ratio sensor which detects an air fuel ratio of gas discharged from each cylinder;
    a discrimination circuit which discriminates a presence or absence of a change to a rich side of an air fuel ratio of the gas detected by the air fuel ratio sensor while fuel supply is stopped for all the cylinders associated with a valve stop request for the exhaust valves and the intake valves of all the cylinders; and
    an exhaust valve abnormality determination circuit which determines that a stopping operation of the exhaust valve is not performed in a normal manner in at least one cylinder when the discrimination circuit discriminates that there is the change to the rich side of the air fuel ratio of the gas, in a case where it is determined that no abnormality has occurred in the stopping operation of the intake valve.

2. The control apparatus for an internal combustion engine including a valve stop mechanism according to claim 1,
    wherein the air fuel ratio sensor is disposed in a region where exhaust gas discharged from a plurality of cylinders converges,
    wherein the discrimination circuit includes a change rate acquisition circuit which acquires a change rate to a rich side of the air fuel ratio of the gas, or a change rate to an increasing side of a decrease correction amount of a fuel injection amount which cancels the change of the air fuel ratio at the time of the reduced-cylinder operation associated with the valve stop request for the exhaust valve of at least one cylinder, but not all the cylinders, and
    wherein the exhaust valve abnormality determination circuit includes number-of-exhaust-valve-abnormality-cylinder determination circuit which determines that the stopping operation of the exhaust valve is not performed in a normal manner in more cylinders as the change rate to the rich side of the air fuel ratio of the gas, or the change rate to an increasing side of the decrease correction amount increases.

3. The control apparatus for an internal combustion engine including a valve stop mechanism according to claim 1,
wherein the air fuel ratio sensor is disposed in a region where exhaust gas discharged from a plurality of cylinders converges,
wherein the discrimination circuit includes a change rate acquisition circuit which acquires the change rate to the rich side of the air fuel ratio of the gas while fuel supply is stopped for all the cylinders associated with the valve stop request for the exhaust valves of all the cylinders, and
wherein the exhaust valve abnormality determination circuit includes number-of-exhaust-valve-abnormality-cylinder determination circuit which determines that the stopping operation of the exhaust valve is not performed in a normal manner in more cylinders as the change rate to the rich side of the air fuel ratio of the gas increases.

4. The control apparatus for an internal combustion engine including a valve stop mechanism according to claim 1, the control apparatus further comprising:
a lean change discrimination circuit which discriminates a presence or absence of a change to a lean side of the air fuel ratio of the gas detected by the air fuel ratio sensor, while fuel supply is stopped for all the cylinders associated with the valve stop request for the exhaust valves and the intake valves of all the cylinders; and
an intake and exhaust valve abnormality determination circuit which determines that stopping operations of the intake valve and the exhaust valve are not performed in a normal manner in at least one cylinder when the lean change discrimination circuit discriminates that there is the change to the lean side of the air fuel ratio of the gas.

5. The control apparatus for an internal combustion engine including a valve stop mechanism according to claim 1,
wherein the internal combustion engine further comprises a valve sensor which detects a presence or absence of an open/close motion of the intake valve, and
wherein the intake valve abnormality determination circuit determines the presence or absence of an abnormality of the stopping operation of the intake valve based on an output of the valve sensor.

6. The control apparatus for an internal combustion engine including a valve stop mechanism according to claim 1,
wherein the internal combustion engine further comprises an intake pressure sensor which detects intake pressure, and
wherein the intake valve abnormality determination circuit determines that the stopping operation of the intake valve is normal when intake pressure equals atmospheric pressure while fuel supply is stopped for all the cylinders associated with the valve stop request for the exhaust valves and the intake valves of all the cylinders.

7. The control apparatus for an internal combustion engine including a valve stop mechanism according to claim 1,
wherein the internal combustion engine further comprises an air flow meter which detects an intake air flow rate, and
wherein the intake valve abnormality determination circuit determines that the stopping operation of the intake valve is normal when the intake air flow rate is not detected by the air flow meter while fuel supply is stopped for all the cylinders associated with the valve stop request for the exhaust valves and the intake valves of all the cylinders.

8. The control apparatus for an internal combustion engine including a valve stop mechanism according to claim 1, the control apparatus further comprising:
an engine rotation maintaining circuit which maintains rotational driving of a crankshaft of the internal combustion engine until processing to detect abnormality of the stopping operation of the exhaust valve by use of the discrimination circuit and the exhaust valve abnormality determination circuit is completed.

9. A control apparatus for an internal combustion engine including a valve stop mechanism, the control apparatus comprising:
an exhaust valve stop mechanism to change an operation state of an exhaust valve between a valve operating state and a valve closed and stopped state, the exhaust valve being provided in at least one cylinder, but not all cylinders of an internal combustion engine including a plurality of cylinders;
an intake valve stop mechanism to change an operation state of an intake valve between a valve operating state and a valve closed and stopped state, the intake valve being provided in a cylinder to which the exhaust valve controlled by the exhaust valve stop mechanism belongs,
an intake valve abnormality determination circuit which determines a presence or absence of an abnormality of a stopping operation of the intake valve by the intake valve stop mechanism;
an air fuel ratio sensor which detects an air fuel ratio of gas discharged from each cylinder;
a discrimination circuit which discriminates a presence or absence of a change to a rich side of an air fuel ratio of the gas detected by the air fuel ratio sensor, or the presence or absence of a change of a decrease correction amount of a fuel injection amount which cancels the change of the air fuel ratio at the time of a reduced-cylinder operation associated with a valve stop request for the exhaust valve and the intake valve of at least one cylinder, but not all the cylinders; and
an exhaust valve abnormality determination circuit which determines that a stopping operation of the exhaust valve is not performed in a normal manner in at least one cylinder when the discrimination circuit discriminates that there is the change to the rich side of the air fuel ratio of the gas, or the change of the decrease correction amount, in a case where it is determined that no abnormality has occurred in stopping operation of the intake valve.

10. The control apparatus for an internal combustion engine including a valve stop mechanism according to claim 9, the control apparatus further comprising:
a feedback control prohibition circuit which prohibits execution of a feedback control of an air fuel ratio utilizing an output of the air fuel ratio sensor until processing to detect abnormality of the stopping operation of the exhaust valve by using the discrimination circuit and the exhaust valve abnormality determination circuit is completed.

11. The control apparatus for an inlemal combustion engine including a valve stop mechanism according to claim 9,
wherein the air fuel ratio sensor is disposed in a region where exhaust gas discharged from a plurality of cylinders converges,
wherein the discrimination circuit includes a change rate acquisition circuit which acquires a change rate to a rich side of the air fuel ratio of the gas, or a change rate to an increasing side of a decrease correction amount of a fuel injection amount which cancels the change of the air fuel ratio at the time of the reduced-cylinder operation associated with the valve stop request for the exhaust valve of at least one cylinder, but not all the cylinders, and wherein the exhaust valve abnormality determination circuit includes number-of-exhaust-valve-abnormalily-cylinder determination circuit which determines that the stopping operation of the exhaust valve is not performed in a normal manner in more cylinders as the change rate to the rich side of the air fuel ratio of the gas, or the change rate to an increasing side of the decrease correction amount increases.

12. The control apparatus for an internal combustion engine including a valve stop mechanism according to claim 9, the control apparatus further comprising:

a lean change discrimination circuit which discriminates a presence or absence of a change to a lean side of the air fuel ratio of the gas detected by the air fuel ratio sensor, or a presence or absence of a change to an increasing side of an increase correction amount of a fuel injection amount which cancels the change of the air fuel ratio, at the time of a reduced-cylinder operation associated with a valve stop request for the exhaust valve and the intake valve of at least one cylinder, but not all the cylinders; and an intake and exhaust valve abnormality determination circuit which determines that stopping operations of the intake valve and the exhaust valve are not performed in a normal manner in at least one cylinder, when the lean change discrimination circuit discriminates that there is the change to the lean side of the air fuel ratio of the gas or the change of the increase correction amount.

13. The control apparatus for an internal combustion engine including a valve stop mechanism according to claim 9, wherein the air fuel ratio sensor is disposed in a region where exhaust gas discharged from a plurality of cylinders converges, wherein the discrimination circuit includes rich cylinder discrimination circuit which discriminates a cylinder in which the air fuel ratio of the gas changes to a value of the rich side based on a timing at which the gas discharged from each cylinder arrives at the air fuel ratio sensor, and wherein the exhaust valve abnormality determination circuit further comprises exhaust valve abnormality cylinder identification circuit which identifies that a cylinder which is discriminated by the rich cylinder discrimination circuit that the air fuel ratio of the gas changed to the value of the rich side is a cylinder in which an abnormality of the stopping operation of the exhaust valve has occurred.

14. The control apparatus for an internal combustion engine including a valve stop mechanism according to claim 9, wherein the internal combustion engine further comprises a valve sensor which detects a presence or absence of an open/close motion of the intake valve, and wherein the intake valve abnormality determination circuit determines the presence or absence of an abnormality of the stopping operation of the intake valve based on an output of the valve sensor.

15. A control apparatus for an internal combustion engine including a valve stop mechanism, the control apparatus comprising:

an exhaust valve stop mechanism to change an operation state of an exhaust valve between a valve operating state and a valve closed and stopped state, the exhaust valve being provided in all cylinders of an internal combustion engine including at least one cylinder;

an intake valve stop mechanism to change an operation state of an intake valve between a valve operating state and a valve closed and stopped state, the intake valve being provided in all the cylinders;

an air fuel ratio sensor which detects an air fuel ratio of gas discharged from each cylinder; and a controller that is programmed to:

determine a presence or absence of an abnormality of a stopping operation of the intake valve by the intake valve stop mechanism;

discriminate a presence or absence of a change to a rich side of an air fuel ratio of the gas detected by the air fuel ratio sensor while fuel supply is stopped for all the cylinders associated with a valve stop request for the exhaust valves and the intake valves of all the cylinders; and determine that a stopping operation of the exhaust valve is not performed in a normal manner in at least one cylinder when the it is discriminated that there is the change to the rich side of the air fuel ratio of the gas, in a case where it is determined that no abnormality has occurred in the stopping operation of the intake valve.

16. A control apparatus for an internal combustion engine including a valve stop mechanism, the control apparatus comprising:

an exhaust valve stop mechanism to change an operation state of an exhaust valve between a valve operating state and a valve closed and stopped state, the exhaust valve being provided in at least one cylinder, but not all cylinders of an internal combustion engine including a plurality of cylinders;

an intake valve stop mechanism to change an operation state of an intake valve between a valve operating state and a valve closed and stopped state, the intake valve being provided in a cylinder to which the exhaust valve controlled by the exhaust valve stop mechanism belongs, an air fuel ratio sensor which detects an air fuel ratio of gas discharged from each cylinder; and a controller that is programmed to:

determine a presence or absence of an abnormality of a stopping operation of the intake valve by the intake valve stop mechanism;

discriminate a presence or absence of a change to a rich side of an air fuel ratio of the gas detected by the air fuel ratio sensor, or the presence or absence of a change of a decrease correction amount of a fuel injection amount which cancels the change of the air fuel ratio at the time of a reduced-cylinder operation associated with a valve stop request for the exhaust valve and the intake valve of at least one cylinder, but not all the cylinders; and determine that a stopping operation of the exhaust valve is not performed in a normal manner in at least one cylinder when it is discriminated that there is the change to the rich side of the air fuel ratio of the gas, or the change of the decrease correction amount, in a case where it is determined that no abnormality has occurred in stopping operation of the intake valve.

* * * * *